United States Patent
Cho et al.

(10) Patent No.: US 12,542,575 B2
(45) Date of Patent: Feb. 3, 2026

(54) ELECTRONIC DEVICE FOR PROCESSING RADIO SIGNAL AND OPERATING METHOD THEREOF

(71) Applicant: SAMSUNG ELECTRONICS CO., LTD., Suwon-si (KR)

(72) Inventors: Namjun Cho, Suwon-si (KR); Hyosung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 555 days.

(21) Appl. No.: 17/553,005

(22) Filed: Dec. 16, 2021

(65) Prior Publication Data

US 2022/0149887 A1 May 12, 2022

Related U.S. Application Data

(63) Continuation of application No. PCT/KR2021/016494, filed on Nov. 12, 2021.

(30) Foreign Application Priority Data

Nov. 12, 2020 (KR) .................. 10-2020-0151130
Mar. 18, 2021 (KR) .................. 10-2021-0035109

(51) Int. Cl.
*H04B 1/44* (2006.01)
*H01Q 21/24* (2006.01)
(Continued)

(52) U.S. Cl.
CPC ............... *H04B 1/44* (2013.01); *H01Q 21/24* (2013.01); *H04B 1/0483* (2013.01); *H04B 1/16* (2013.01); *H04B 7/0617* (2013.01)

(58) Field of Classification Search
CPC .......... H04B 1/16; H04B 1/44; H04B 1/0483; H04B 7/0617; H01Q 21/24
See application file for complete search history.

(56) References Cited

U.S. PATENT DOCUMENTS 7,212,788 B2   5/2007   Weber et al.
7,889,121 B2   2/2011   Kanto
(Continued)

FOREIGN PATENT DOCUMENTS

EP   3 681 043 A1   7/2020
KR   10-1511458 B1   4/2015
(Continued)

OTHER PUBLICATIONS

Extended European Search Report dated Feb. 26, 2024 for EP Application No. 21892354.8.
(Continued)

*Primary Examiner* — Raymond S Dean
(74) *Attorney, Agent, or Firm* — NIXON & VANDERHYE P.C.

(57) ABSTRACT

An electronic device includes: a first antenna structure and a second antenna structure. A wireless communication circuitry is configured to transmit and/or receive a radio frequency (RF) signal via the first antenna structure and the second antenna structure. The wireless communication circuitry include first front-end circuitry, second front-end circuitry, first transmission path configured to output the RF signal which has been generated by up-converting a transmission signal input through a first input/output port of the wireless communication circuitry, to the first front-end circuitry or the second front-end circuitry,; and a first reception path corresponding to the first front-end circuitry and, a second reception path corresponding to the second front-end circuitry.

19 Claims, 13 Drawing Sheets

(51) Int. Cl.
  *H04B 1/04* (2006.01)
  *H04B 1/16* (2006.01)
  *H04B 7/06* (2006.01)

(56) References Cited

U.S. PATENT DOCUMENTS

| | | |
|---|---|---|
| 9,160,296 B2 | 10/2015 | Ehyaie |
| 9,172,441 B2 | 10/2015 | Granger-Jones et al. |
| 9,276,314 B2 | 3/2016 | Bang et al. |
| 2012/0112970 A1 | 5/2012 | Caballero et al. |
| 2012/0275499 A1 | 11/2012 | Anreddy et al. |
| 2015/0280651 A1 | 10/2015 | Uzunkol et al. |
| 2016/0043470 A1* | 2/2016 | Ko .................. H01Q 21/28 343/893 |
| 2016/0066307 A1 | 3/2016 | Huang et al. |
| 2017/0301986 A1* | 10/2017 | Nguyen .............. H01L 21/268 |
| 2018/0288683 A1 | 10/2018 | Bendlin et al. |
| 2019/0058264 A1* | 2/2019 | Jung .................. H01Q 9/0435 |
| 2019/0363453 A1 | 11/2019 | Yu et al. |
| 2020/0021015 A1* | 1/2020 | Yun ................... H01Q 1/2283 |
| 2020/0144733 A1* | 5/2020 | Chakraborty ......... H01Q 1/243 |
| 2020/0220572 A1 | 7/2020 | Kwon et al. |
| 2020/0244302 A1 | 7/2020 | Chi et al. |
| 2020/0252115 A1 | 8/2020 | Paramesh et al. |
| 2021/0152673 A1* | 5/2021 | Patil .................. H04L 69/22 |
| 2021/0159926 A1 | 5/2021 | Kim et al. |
| 2022/0060230 A1 | 2/2022 | Na et al. |
| 2022/0416819 A1* | 12/2022 | Kim ..................... H04B 1/50 |
| 2023/0014394 A1* | 1/2023 | Ilvonen ............... H01Q 21/28 |

FOREIGN PATENT DOCUMENTS

| | | |
|---|---|---|
| KR | 10-1781978 B1 | 9/2017 |
| KR | 10-2018-0018492 A | 2/2018 |
| KR | 10-2019-0060520 A | 6/2019 |
| WO | WO 2022/103187 | 5/2019 |
| WO | WO 2020/054973 A1 | 3/2020 |
| WO | WO 2021/153819 | 8/2021 |

OTHER PUBLICATIONS

Written Opinion dated Feb. 17, 2022 for PCT/KR2021/016494.
Notice of Publication dated May 19, 2022 for PCT/KR2021/016494.
International Search Report dated Feb. 17, 2022 for PCT/KR2021/016494.
India Office Action dated Jun. 28, 2024 for IN Application No. 202317030278.
Office Action for KR Application No. 10-2021-0035109 dated May 2, 2025 and English translation, 14 pages.
Hearing Notice for IN Application No. 202317030278 dated Oct. 23, 2025, 3 pages.
Office Action for EP Application No. 21892354.8 dated Dec. 10, 2025, 7 pages.

* cited by examiner

ELECTRONIC DEVICE FOR PROCESSING RADIO SIGNAL AND OPERATING METHOD THEREOF

CROSS-REFERENCE TO RELATED APPLICATIONS

This application is a continuation of International Application No. PCT/KR2021/016494 designating the United States, filed on Nov. 12, 2021, in the Korean Intellectual Property Receiving Office and claiming priority to Korean Patent Application Nos. 10-2020-0151130, filed on Nov. 12, 2020, and 10-2021-0035109, filed Mar. 18, 2021, in the Korean Intellectual Property Office, the disclosures of which are incorporated by reference herein in their entireties.

BACKGROUND

Field

The disclosure relates to a device and/or a method for processing radio signal(s) in an electronic device.

Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or "Post LTE" communication system. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beam forming, large scale antenna techniques are discussed in 5G communication systems.

An electronic device may include multiple array antennas that form beams in different directions. The electronic device may transmit and/or receive a signal to and/or from an external device (e.g., base station) via a beam formed using at least one of the multiple antennas.

The electronic device may switch an array antenna used for communication with an external device to another array antenna, based on a communication quality with the external device in order to increase communication reliability. In order to switch the array antenna, the electronic device may monitor a received signal strength or communication quality with respect to at least one remaining array antenna that is not used for communication with the external device.

The electronic device may include a circuit (e.g., radio frequency integrated circuit (RFIC)) configured to process a radio frequency (RF) signal transmitted and/or received through at least one array antenna. The circuit that processes an RF signal may include an element configured to process an RF signal transmitted and/or received through at least one array antenna for communication with an external device and an element for monitoring at least one remaining array antenna.

The circuit (e.g., RFIC) that processes an RF signal may require a relatively larger physical area as a structure becomes relatively complex. As a physical area occupied by the circuit configured to process an RF signal in the electronic device increases, the size of the electronic device may increase and cost may increase.

SUMMARY

Various embodiments of the disclosure relate to a device and/or a method for reducing the complexity of a circuit (e.g., RFIC) configured to process an RF signal(s) in an electronic device.

According to various example embodiments, an electronic device may include: a first antenna structure configured to form a first polarization and/or a second polarization perpendicular to the first polarization and include multiple first antenna elements, and a second antenna structure configured to form a third polarization and/or a fourth polarization perpendicular to the third polarization and include multiple second antenna elements; and a wireless communication circuit configured to transmit and/or receive a radio frequency signal via the first antenna structure and the second antenna structure, wherein the wireless communication circuit includes: a first front-end circuit configured to amplify power of a first radio frequency transmission signal to be transmitted via the first polarization of the first antenna structure, and low noise amplify a first radio frequency reception signal received via the first polarization of the first antenna structure; a second front-end circuit configured to amplify power of a second radio frequency transmission signal to be transmitted via the third polarization of the second antenna structure, and low noise amplify a second radio frequency reception signal received via the third polarization of the second antenna structure; a third front-end circuit configured to amplify power of a third radio frequency transmission signal to be transmitted via the second polarization of the first antenna structure, and low noise amplify a third radio frequency reception signal received via the second polarization of the first antenna structure; a fourth front-end circuit configured to amplify power of a fourth radio frequency transmission signal to be transmitted via the fourth polarization of the second antenna structure, and low noise amplify a fourth radio frequency reception signal received via the fourth polarization of the second antenna structure; a first transmission path configured to output at least one of the first radio frequency transmission signal or the second radio frequency transmission signal, which has been generated by up-converting a transmission signal input through a first input/output port of the wireless communication circuit, to the first front-end circuit or the second front-end circuit, respectively; a first reception path configured to down-covert at least one of the first radio frequency reception signal or the second radio frequency reception signal, which has been output from the first front-end circuit or the second front-end circuit, respectively, so as to output the same to the first input/output port, and a second transmission path configured to output at least one of the third radio frequency transmission signal or the fourth radio frequency transmission signal, which has been generated by up-converting a transmission signal input through a second input/output port of the wireless communication circuit, to the third front-end circuit or the fourth front-end circuit, respectively; and a second reception path configured to down-convert at least one of the third radio frequency reception signal or the fourth radio frequency reception signal, which has been output from the third front-end circuit or the fourth front-end circuit, respectively, so as to output the same to the second input/output port, and a third reception path configured to down-convert at least one of the first radio frequency reception signal, the second radio frequency reception signal, the third radio frequency reception signal, or the fourth radio frequency reception signal, which has been output from at least one of the first front-end circuit, the second front-end circuit, the third front-end circuit, or the fourth front-end circuit, respectively, so as to output the same to an output port of the wireless communication circuit.

According to various embodiments, an electronic device may include: a first antenna structure including multiple first antenna elements, and a second antenna structure including multiple second antenna elements; and a wireless communication circuit configured to transmit and/or receive radio frequency signals via the first antenna structure and the second antenna structure, wherein the wireless communication circuit includes: a first front-end circuit configured to amplify power of a first radio frequency transmission signal to be transmitted via the first antenna structure, and low noise amplify a first radio frequency reception signal received via the first antenna structure; a second front-end circuit configured to amplify power of a second radio frequency transmission signal to be transmitted via the second antenna structure, and low noise amplify a second radio frequency reception signal received via the second antenna structure; a first transmission path configured to output at least one of the first radio frequency transmission signal or the second radio frequency transmission signal, which has been generated by up-converting a transmission signal input through the first input/output port of the wireless communication circuit, to at least one of the first front-end circuit or the second front-end circuit; and a first reception path configured to down-convert the first radio frequency reception signal, which has been output from the first front-end circuit, so as to output the same to the first input/output port, and a second reception path configured to down-convert the second radio frequency reception signal, which has been output from the second front-end circuit, so as to output the same to a first output port of the wireless communication circuit.

According to various example embodiments of the disclosure, an electronic device can reduce the complexity of a circuit (e.g., RFIC) configured to process an RF signal, by configuring a separate reception path for monitoring multiple array antennas and/or configuring the multiple array antennas to share at least a part of a transmission path.

BRIEF DESCRIPTION OF THE DRAWINGS

In relation to the description of the drawings, the same or similar reference numerals may be used with respect to the same or similar elements. Additionally, the above and other aspects, features and advantages of certain embodiments of the present disclosure will be more apparent from the following detailed description, taken in conjunction with the accompanying drawings, in which.

Any of the embodiment(s) described herein may be used in conjunction with any other embodiment(s) described herein.

DETAILED DESCRIPTION

Hereinafter, various example embodiments will be described in greater detail with reference to the figures.

Figure 1:
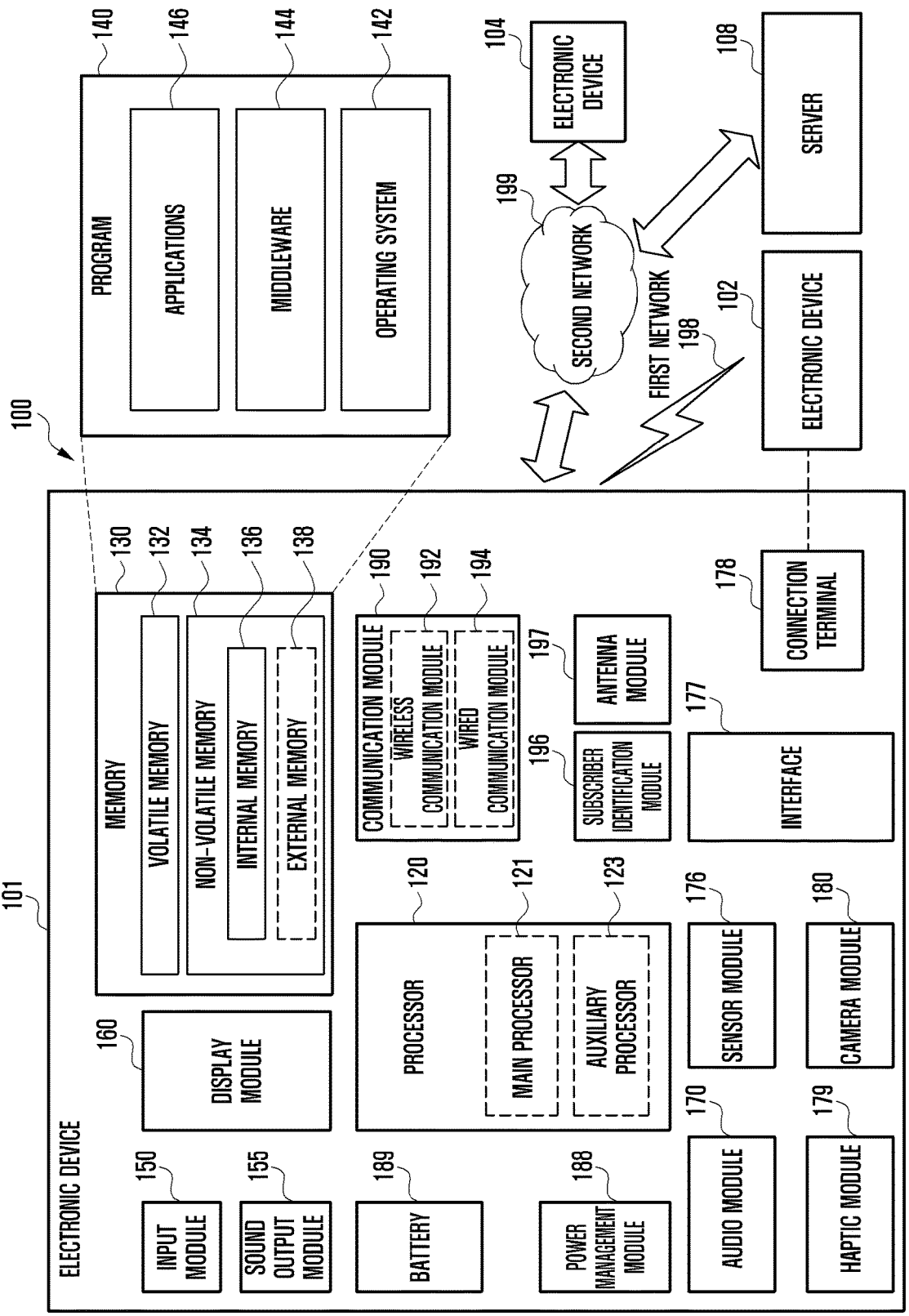
FIG. 1 is a block diagram of an electronic device in a network environment according to various example embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beamforming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. According to an embodiment, the subscriber identification module 196 may include a plurality of subscriber identification modules. For example, the plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include patch array antennas and/or dipole array antennas.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum or small unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
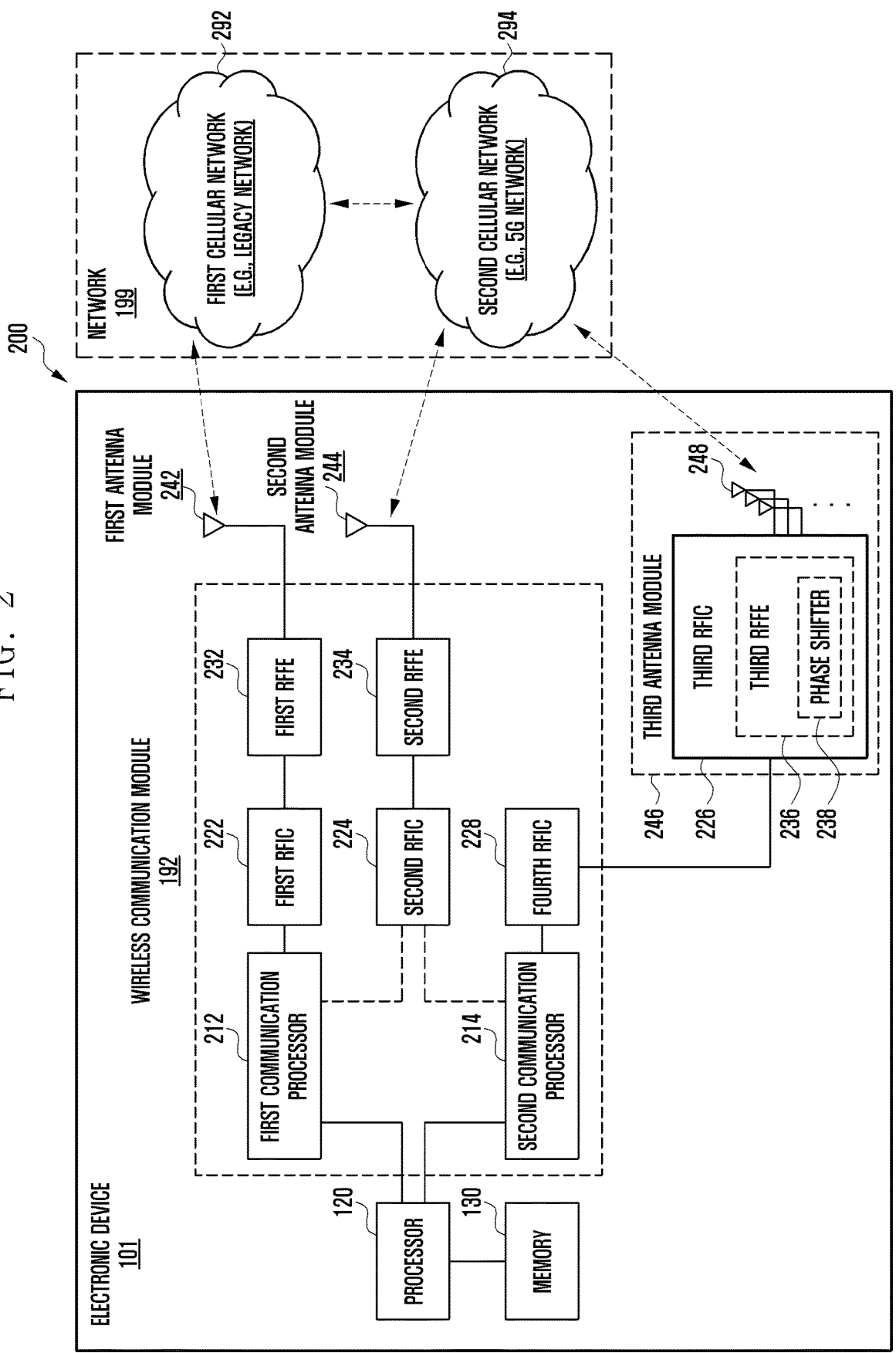
FIG. 2 is a block diagram of the electronic device that supports legacy network communication and 5G network communication according to various example embodiments.

FIG. 2 is a block diagram 200 illustrating an example configuration of an electronic device 101 supporting legacy network communication and 5G network communication according to various embodiments.

Referring to FIG. 2, according to various embodiments, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may include the processor 120 and the memory 130. The network 199 may include a first network 292 and a second network 294. According to an embodiment, the electronic device 101 may further include at least one component among the components illustrated in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may be at least a part of the wireless communication module 192. According to an embodiment, the fourth RFIC 228 may be omitted, or may be included as a part of the third RFIC 226.

The first communication processor 212 may establish a communication channel of a band to be used for wireless communication with the first network 292, and may support legacy network communication via the established communication channel. According to an embodiment, the first network may be a legacy network including second generation (2G), third generation (3G), fourth generation (4G), or long-term evolution (LTE) network. The second communication processor 214 may establish a communication channel corresponding to a designated band (e.g., approximately 6 GHz to 60 GHz) among bands to be used for wireless communication with the second network 294, and may support 5G network communication via the established communication channel. According to an embodiment, the second network 294 may be a 5G network (e.g., new radio (NR)) defined in 3GPP. In addition, according to an embodiment, the first communication processor 212 or the second communication processor 214 may establish a communication channel corresponding to another designated band (e.g., approximately 6 GHz or less) among bands to be used for wireless communication with the second network 294, and may support 5G network communication via the established communication channel. According to an embodiment, the first communication processor 212 and the second communication processor 214 may be implemented in a single chip or a single package. According to an embodiment, the first communication processor 212 or the second communication processor 214 may be implemented in a single chip or a single package, together with the processor 120, the sub-processor 123, or the communication module 190.

According to an embodiment, the first communication processor 212 may perform data transmission or reception with the second communication processor 214. For example, data which has been classified to be transmitted via the second network 294 may be changed to be transmitted via the first network 292.

In this instance, the first communication processor 212 may receive transmission data from the second communication processor 214. For example, the first communication processor 212 may perform data transmission or reception with the second communication processor 214 via an inter-processor interface. The inter-processor interface may be implemented as, for example, a universal asynchronous receiver/transmitter (UART) (e.g., a high speed-UART (HS-UART)) or a peripheral component interconnect bus express (PCIe), but the type of interface is not limited thereto. For example, the first communication processor 212 and the second communication processor 214 may exchange control information and packet data information using, for example, a shared memory. For example, the first communication processor 212 may perform transmission or reception of various types of information such as sensing information, information associated with an output strength, and resource block (RB) allocation information, with the second communication processor 214.

Depending on implementation, the first communication processor 212 may not be directly connected to the second communication processor 214. In this instance, the first communication processor 212 may perform data transmission or reception with the second communication processor 214, via the processor 120 (e.g., an application processor). For example, the first communication processor 212 and the second communication processor 214 may perform data transmission or reception via the processor 120 (e.g., an application processor) and a HS-UART interface or a PCIe interface, but the type of interface is not limited. For example, the first communication processor 212 and the second communication processor 214 may exchange control information and packet data information using the processor 120 (e.g., an application processor) and a shared memory. According to an embodiment, the first communication processor 212 and the second communication processor 214 may be implemented in a single chip or a single package. According to various embodiments, the first communication processor 212 or the second communication processor 214 may be implemented in a single chip or a single package, together with the processor 120, the sub-processor 123, or the communication module 190.

In the case of transmission, the first RFIC 222 may convert a baseband signal generated by the first communication processor 212 into a radio frequency (RF) signal in the range of approximately 700 MHz to 3 GHz, which is used in the first network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal into a baseband signal so that the baseband signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal) in an Sub6 band (e.g., approximately 6 GHz or less) used in the second network 294 (e.g., a 5G network). In the case of reception, a 5G Sub6 RF signal may be obtained from the second network 294 (e.g., a 5G network) via an antenna (e.g., the second antenna module 244), and may be preprocessed by an RFFE (e.g., the second RFFE 234). The second RFIC 224 may convert the preprocessed 5G Sub6 RF signal into a baseband signal so that the signal may be processed by a corresponding communication processor among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used in the second network 294 (e.g., a 5G network). In the case of reception, a 5G Above6 RF signal is obtained from the second network 294 (e.g., a 5G network) via an antenna (e.g., the antenna 248), and may be preprocessed by the third RFFE 236. The third RFIC 226 may convert the preprocessed 5G Above6 RF signal into a baseband signal so that the signal is processed by the second communication processor 214. According to an embodiment, the third RFFE 236 may be implemented as a part of the third RFIC 226.

According to an embodiment, the electronic device 101 may include the fourth RFIC 228, separately from or, as a part of, the third RFIC 226. In this instance, the fourth RFIC 228 may convert a baseband signal produced by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal into a 5G Above6 RF signal. In the case of reception, a 5G Above6 RF signal may be received from the second network 294 (e.g., a 5G network) via an antenna (e.g., the antenna 248), and may be converted into an IF signal by the third RFIC 226. The fourth RFIC 228 may convert the IF signal into a baseband signal so that the second communication processor 214 is capable of processing the baseband signal.

According to an embodiment, the first RFIC 222 and the second RFIC 224 may be implemented as at least a part of a single chip or a single package. According to an embodiment, the first RFFE 232 and the second RFFE 234 may be implemented as at least a part of a single chip or single package. According to an embodiment, at least one of the first antenna module 242 or the second antenna module 244 may be omitted or may be combined with another antenna module, to process RF signals of a plurality of corresponding bands.

According to an embodiment, the third RFIC 226 and the antenna 248 may be disposed in the same substrate, and may form a third antenna module 246. For example, the wireless communication module 192 or the processor 120 may be disposed in a first substrate (e.g., a main PCB). In this instance, the third RFIC 226 is disposed in a part (e.g., a lower part) of a second substrate (e.g., a sub PCB) different from the first substrate, and the antenna 248 is disposed in another part (e.g., an upper part), so that the third antenna module 246 may be formed. By disposing the third RFIC 226 and the antenna 248 in the same substrate, the length of a transmission line therebetween may be reduced. For example, this may reduce a loss (e.g., a diminution) of a high-frequency band signal (e.g., approximately 6 GHz to 60 GHz) used for 5G network communication, the loss being caused by a transmission line. Accordingly, the electronic device 101 may improve the quality or speed of communication with the second network 294 (e.g., a 5G network).

According to an embodiment, the antenna 248 may be implemented as an antenna array including a plurality of antenna elements which may be used for beamforming. In this instance, the third RFIC 226, for example, may include a plurality of phase shifters 238 corresponding to a plurality of antenna elements, as a part of the third RFFE 236. In the case of transmission, each of the plurality of phase shifters 238 may shift the phase of a 5G Above6RF signal to be transmitted to the outside of the electronic device 101 (e.g., a base station of a 5G network) via a corresponding antenna element. In the case of reception, each of the plurality of phase shifters 238 may shift the phase of a 5G Above6 RF signal received from the outside via a corresponding antenna element into the same or substantially the same phase. This may enable transmission or reception via beamforming between the electronic device 101 and the outside.

The second network 294 (e.g., a 5G network) may operate independently (e.g., Standalone (SA)) from the first network 292 (e.g., a legacy network), or may operate by being connected thereto (e.g., Non-Standalone (NSA)). For example, in the 5G network, only an access network (e.g., 5G radio access network (RAN) or next generation RAN (NG RAN)) may exist, and a core network (e.g., next generation core (NGC)) may not exist. In this instance, the electronic device 101 may access the access network of the 5G network, and may access an external network (e.g., the Internet) under the control of the core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 130, and may be accessed by another component (e.g., the processor 120, the first communication processor 212, or the second communication processor 214).

In the above and/or following description(s), an electronic device may process RF signals transmitted and/or received via two antenna structures (e.g., array antennas) using, for example, a single wireless communication circuit. However, the number of antenna structures connected to the wireless communication circuit is not limited thereto, and may be formed substantially in the same manner even when multiple antenna structures are connected to the wireless communication circuit.

Figure 3A:
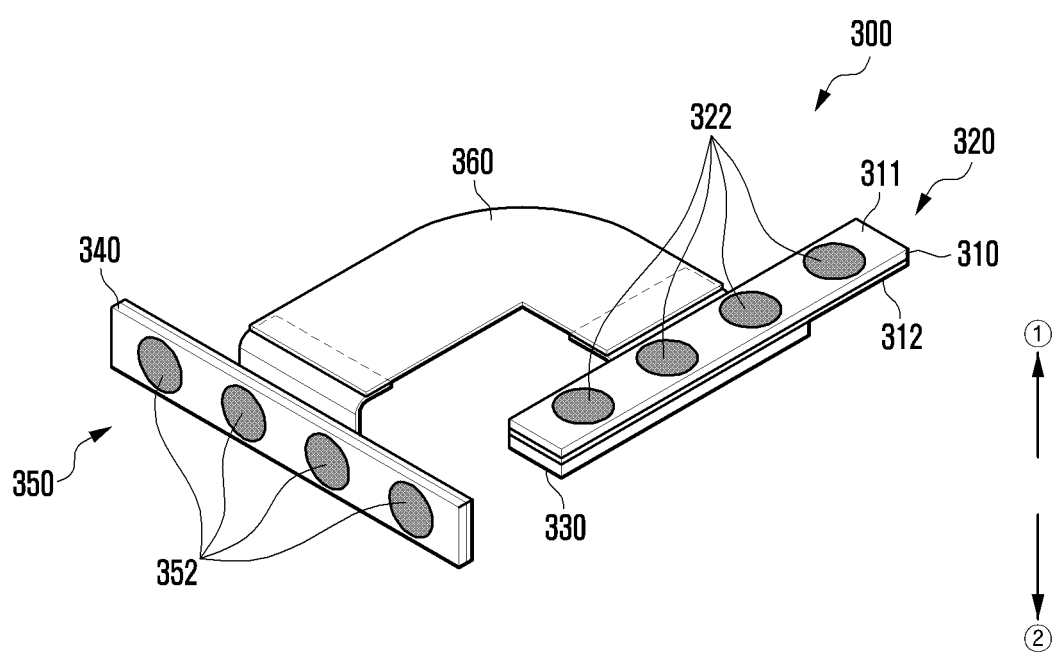
FIG. 3A is an example of an antenna module including multiple array antennas according to various example embodiments.
Figure 3B:
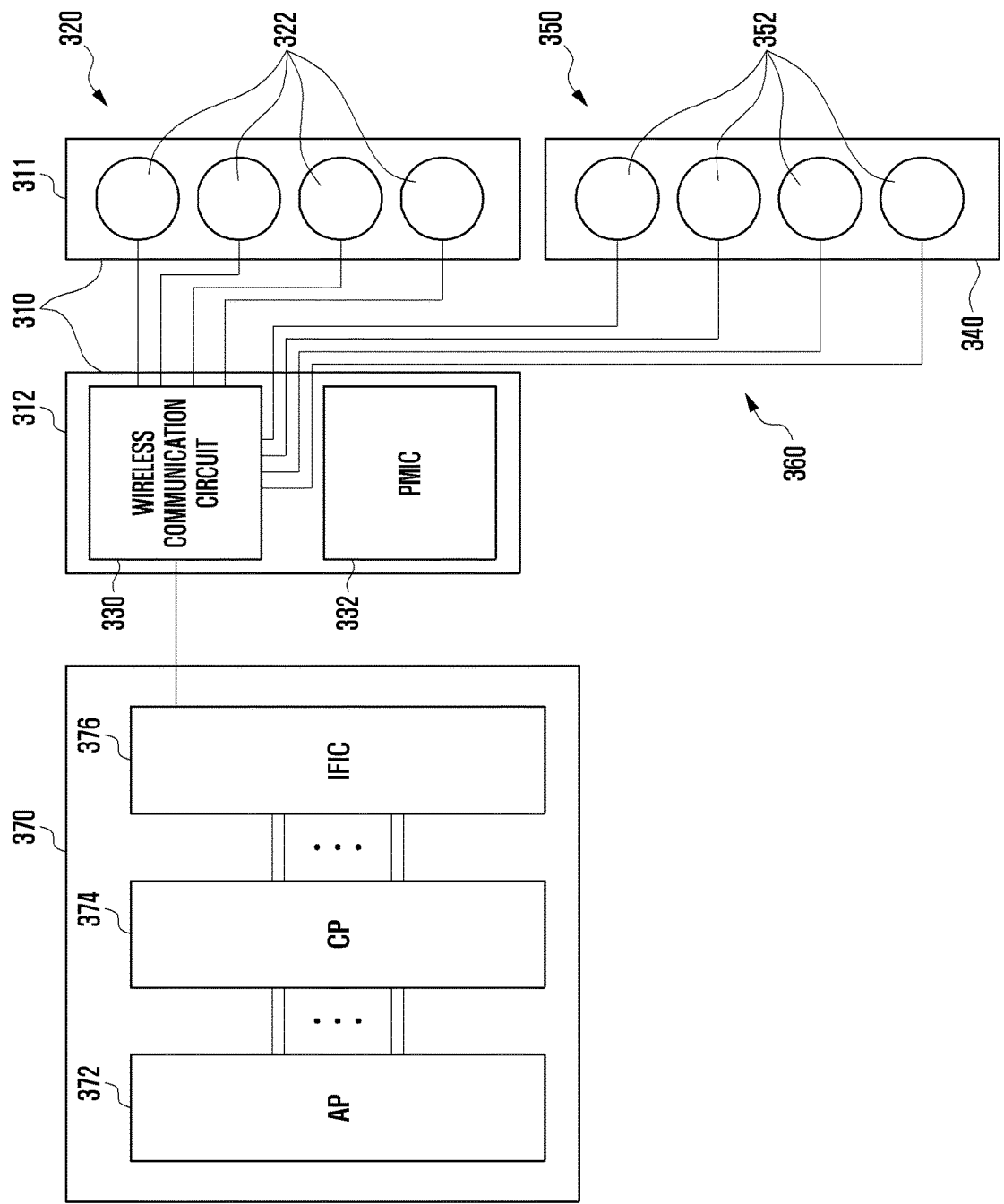
FIG. 3B is an example of a structure for processing of a signal transmitted and/or received through an antenna module in an electronic device according to various example embodiments.

Any of the embodiment(s) described herein may be used in conjunction with any other embodiment(s) described herein. FIG. 3A is an example of an antenna module including multiple array antennas according to various example embodiments. FIG. 3B is an example of a structure for processing a signal transmitted and/or received through an antenna module in an electronic device according to various example embodiments. According to an example embodiment, an antenna module 300 of FIG. 3A and FIG. 3B may be, or be at least partially similar to, the third antenna module 246 of FIG. 2, or may further include other embodiments.

Referring to FIG. 3A and FIG. 3B, according to various example embodiments, the antenna module 300 may include a first printed circuit board 310, a first antenna structure 320, a wireless communication circuit 330, and a second printed circuit board 340, and/or a second antenna structure 350. According to an example embodiment, the first printed circuit board 310 and the second printed circuit board 340 may be electrically connected via an electrical connection member 360. For example, the electrical connection member 360 may include a radio frequency (RF) coaxial cable or a flexible circuit board (FRC; flexible printed circuit board (FPCB) type RF cable). According to an embodiment, the first printed circuit board 310 and/or the second printed circuit board 340 may be formed of a rigid flexible circuit board (e.g., rigid or rigid flexible printed circuit board).

According to various example embodiments, the first antenna structure 320 may be an array antenna and may include multiple first antenna elements (antennas) 322 disposed to form a directional beam. According to an example embodiment, the first printed circuit board 310 may include a first surface 311 facing a first direction (direction ①) and a second surface 312 facing a direction (direction ②) opposite to the first surface 311. According to an example embodiment, the multiple first antenna elements 322 may be disposed on the first surface 311 of the first printed circuit board 310. According to another example embodiment, the multiple first antenna elements 322 may be disposed inside the first printed circuit board 320. According to an example embodiment, the multiple first antenna elements 322 may be disposed at regular intervals. For example, the multiple first antenna elements 322 may have substantially the same configuration (e.g., size, shape, thickness, and/or material). For example, the first antenna structure 320 may include four first antenna elements 322 as shown in FIG. 3A and FIG. 3B. However, the number of the first antenna elements 322 included in the first antenna structure 320 is not limited thereto, and there may be multiple first antenna elements.

According to various example embodiments, the second antenna structure 350 may be an array antenna and may include multiple second antenna elements 352 disposed to form a directional beam. According to certain example embodiment(s), the multiple second antenna elements 352 may be disposed on one surface of the second printed circuit board 340 and/or inside the second printed circuit board 340.

According to an example embodiment, the multiple second antenna elements 352 may be disposed at regular intervals. For example, the multiple second antenna elements 352 may have substantially the same configuration (e.g., size, shape, thickness, and/or material). For example, the second antenna structure 350 may include four second antenna elements 352 as shown in FIG. 3A and FIG. 3B. However, the number of the second antenna elements 352 included in the second antenna structure 350 is not limited thereto, and there may be multiple second antenna elements.

According to various example embodiments, the wireless communication circuit 330 (e.g., third RFIC 226 of FIG. 2) may be disposed in another area (e.g., second surface 312) of the first printed circuit board 310 spaced apart from the first antenna structure 320. According to an example embodiment, as shown in FIG. 3B, the wireless communication circuit 330 may be electrically connected to the multiple first antenna elements 322 disposed on the first printed circuit board 310 and to the multiple second antenna elements 352 disposed on the second printed circuit board 340. According to an example embodiment, the wireless communication circuit 330 may be configured to transmit and/or receive a radio frequency of a first frequency band (e.g., about 1.8 GHz and/or 3 GHz to 100 GHz) via the first antenna structure 320 and/or the second antenna structure 350. For example, the wireless communication circuit 330 may be configured to transmit and/or receive a signal of a first communication scheme via the first antenna structure 320 and/or the second antenna structure 350. For example, the first communication scheme may include a 5G mobile communication scheme (e.g., new radio (NR)) and/or a communication scheme of a high frequency (e.g., mmWave) band.

According to an example embodiment, the wireless communication circuit 330 may up-convert an IF signal (e.g., about 9 GHz to about 11 GHz) acquired from an intermediate frequency integrate circuit (IFIC) 376 (e.g., fourth RFIC 228 of FIG. 2) into an RF signal of a selected band. The wireless communication circuit 330 may down-convert an RF signal received via the first antenna structure 320 and/or the second antenna structure 350 into an IF signal so as to transfer the IF signal to the IFIC 376. For example, the IFIC 376 may be disposed on a third printed circuit board 370 (e.g., main PCB) as shown in FIG. 3B.

According to various example embodiments, the third printed circuit board 370 may include an application processor (AP) 372, a communication processor (CP) 374, and/or the IFIC 376. For example, the AP 372 (e.g., main processor 121 of FIG. 1) may include processing circuitry and perform a variety of data processing or calculations so as to control at least one other element (e.g., CP 374) included in an electronic device (e.g., electronic device 101 of FIG. 1). For example, the CP 374 (e.g., auxiliary processor 123 of FIG. 1 or the first communication processor 212 and/or second communication processor 214 of FIG. 2, each of which may include processing circuitry) may generate a baseband signal for direct communication or wireless communication so as to transfer the baseband signal to the IFIC 376. The IFIC 376 may up-convert the baseband signal transferred from the CP 374 into an IF signal so as to transfer the IF signal to the wireless communication circuit 330. For example, the IFIC 376 may down-convert the IF signal transferred from the wireless communication circuit 330 into a baseband signal so as to transfer the baseband signal from the CP 374. The CP 374 may process the baseband signal transferred from the IFIC 376.

According to various embodiments, the antenna module 300, which includes antennas, may also include a power manage integrate circuit (PMIC) 332. According to an example embodiment, the PMIC 332 may be disposed in another area (e.g., second surface 312) of the first printed circuit board 310 spaced apart from the first antenna structure 320. The PMIC 332 may receive voltage from the third printed circuit board 370 (e.g., main PCB) so as to provide power to various components (e.g., wireless communication circuit 330) on the antenna module 300.

According to various example embodiments, the wireless communication circuit 330 may up-convert the baseband signal acquired from the CP 374 into an RF signal of a designated band. The wireless communication circuit 330 may down-convert the RF signal received via the first antenna structure 320 and/or the second antenna structure 350 into a baseband signal so as to transfer the baseband signal to the CP 374.

Figure 4A:
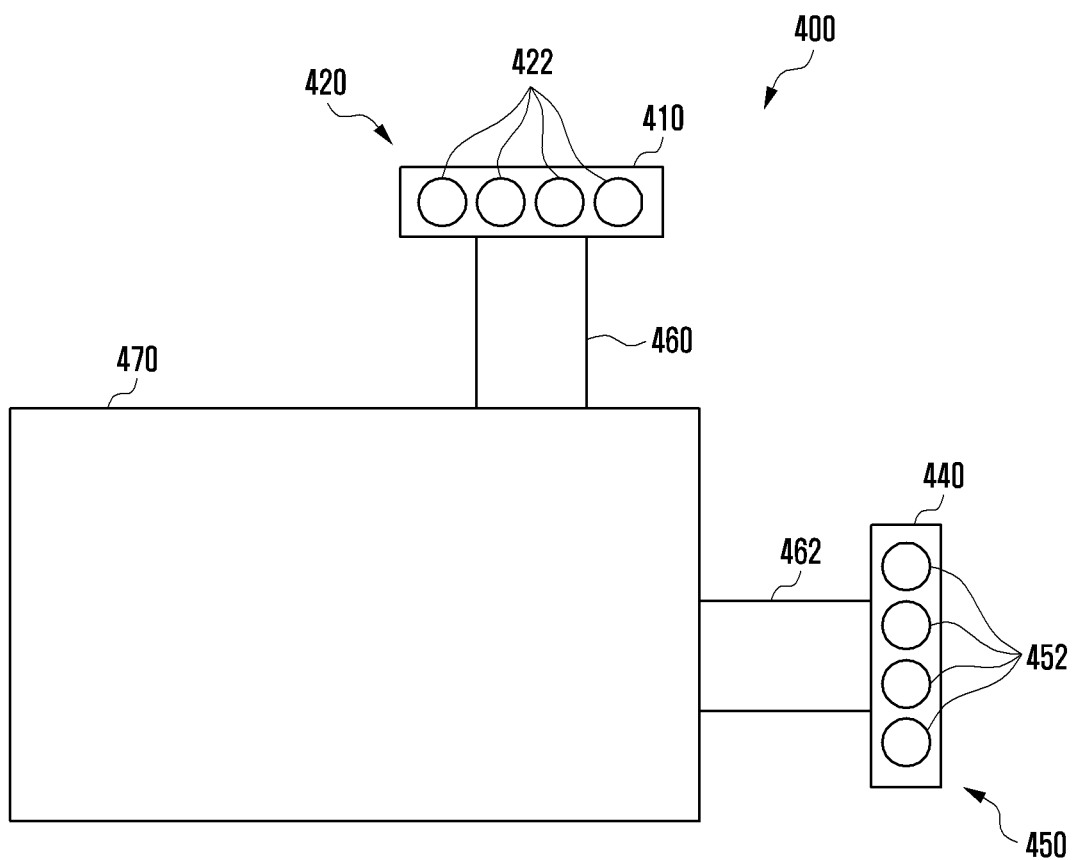
FIG. 4A is another example of an antenna module including multiple array antennas according to various example embodiments.
Figure 4B:
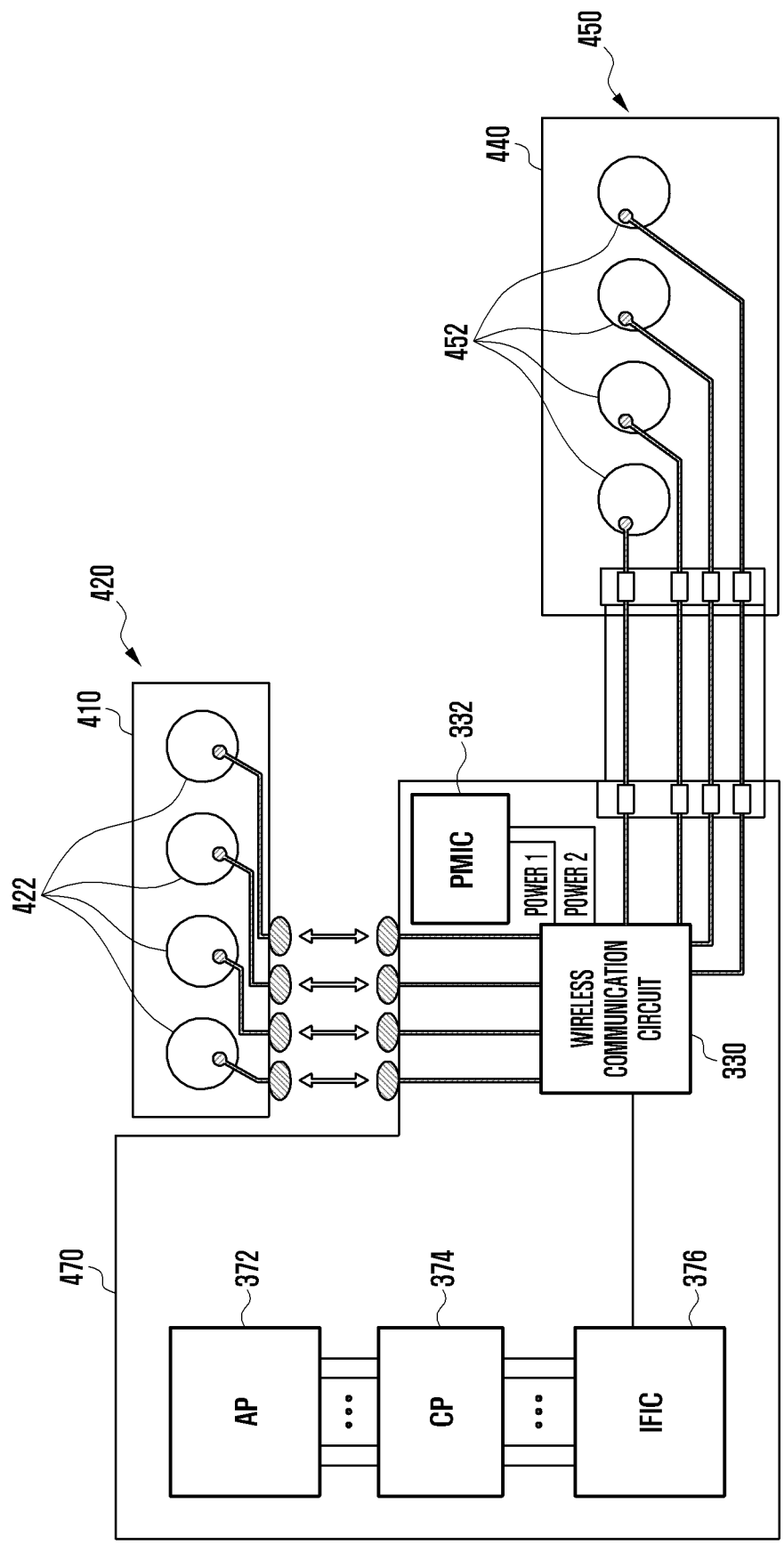
FIG. 4B is another example of a structure for processing of a signal transmitted and/or received through an antenna module in an electronic device according to various embodiments.

FIG. 4A is another example of an antenna module including multiple array antennas according to various example embodiments. FIG. 4B is another example of a structure for processing a signal transmitted and/or received through an antenna module in an electronic device according to various example embodiments. According to an example embodiment, an electronic device 400 of FIG. 4A and FIG. 4B may be, or may be at least partially similar to, the electronic device 101 of FIG. 1 or FIG. 2, or may further include other embodiments.

Referring to FIG. 4A and FIG. 4B, according to various example embodiments, the electronic device 400 may include a first antenna structure 420, a second antenna structure 450, and/or a third printed circuit board 470 (e.g., main PCB). According to an example embodiment, the third printed circuit board 470 may be electrically connected to a first printed circuit board 410 via a first electrical connection member 460. The third printed circuit board 470 may be electrically connected to a second printed circuit board 440 via a second electrical connection member 462. For example, the first electrical connection member 460 and/or the second electrical connection member 462 may include an RF coaxial cable or a flexible circuit board (e.g., FRC type RF cable). According to an example embodiment, the first printed circuit board 410, the second printed circuit board 440, and/or the third printed circuit board 470 may be formed of a rigid flexible circuit board.

According to various example embodiments, the first antenna structure 420 may be an array antenna and may include the first printed circuit board 410 and/or multiple first antenna elements 422 disposed to form a directional beam. According to an example embodiment, the multiple first antenna elements 422 may be disposed on one surface of the first printed circuit board 410 and/or inside the first printed circuit board 420. According to an example embodiment, the multiple first antenna elements 422 may be disposed at regular intervals. For example, the multiple first antenna elements 422 may have substantially the same configuration (e.g., size, shape, thickness, and/or material), or may have different configurations. For example, the first antenna structure 420 may include four first antenna elements 422 as shown in FIG. 4A and FIG. 4B. However, the number of the first antenna elements 422 included in the first antenna structure 420 is not limited thereto, and there may be multiple first antenna elements.

According to various example embodiments, the second antenna structure 450 is an array antenna and may include the second printed circuit board 440 and/or multiple second antenna elements 452 disposed to form a directional beam.

According to an example embodiment, the multiple second antenna elements 452 may be disposed on one surface of the second printed circuit board 440 or inside the second printed circuit board 440. According to an example embodiment, the multiple second antenna elements 452 may be disposed at regular intervals. For example, the multiple second antenna elements 452 may have substantially the same configuration (e.g., size, shape, thickness, and/or material), or may have different configurations. For example, the second antenna structure 450 may include four second antenna elements 452 as shown in FIG. 4A and FIG. 4B. However, the number of the second antenna elements 452 included in the second antenna structure 450 is not limited thereto, and there may be multiple second antenna elements.

According to various example embodiments, the third printed circuit board 470 may include the wireless communication circuit 330, the PMIC 332, the AP 372, the CP 374, and/or the IFIC 376. According to an example embodiment, as shown in FIG. 4B, the wireless communication circuit 330 may be electrically connected to the multiple first antenna elements 422 disposed on the first printed circuit board 410 and/or to the multiple second antenna elements 452 disposed on the second printed circuit board 440. According to an example embodiment, the wireless communication circuit 330 may be configured to transmit and/or receive a radio frequency of a first frequency band (e.g., about 1.8 GHz and/or 3 GHz to 100 GHz) via the first antenna structure 420 and/or the second antenna structure 450. For example, the wireless communication circuit 330, PMIC 332, AP 372, CP 374, and/or IFIC 376 of FIG. 4A and FIG. 4B and the wireless communication circuit 330, PMIC 332, AP 372, CP 374, and/or IFIC 376 of FIG. 3A and FIG. 3B may differ only in view of printed circuit boards on which the same are disposed, and may operate similarly to each other. In order to avoid descriptions overlapping with those in FIG. 3A and FIG. 3C, detailed descriptions of the wireless communication circuit 330, the PMIC 332, the AP 372, the CP 374, and/or the IFIC 376 are omitted in FIG. 4A and FIG. 4B.

According to various example embodiments, RFICs and RFFEs of the wireless communication circuit 330 may be disposed on different printed circuit boards. According to an example embodiment, the RFICs of the wireless communication circuit 330 may be disposed on the third printed circuit board 470. An RFFE of the wireless communication circuit 330, which corresponds to the multiple first antenna elements 422, may be disposed on the first printed circuit board 420. An RFFE of the wireless communication circuit 330, which corresponds to the multiple second antenna elements 452, may be disposed on the second printed circuit board 440.

Figure 5:
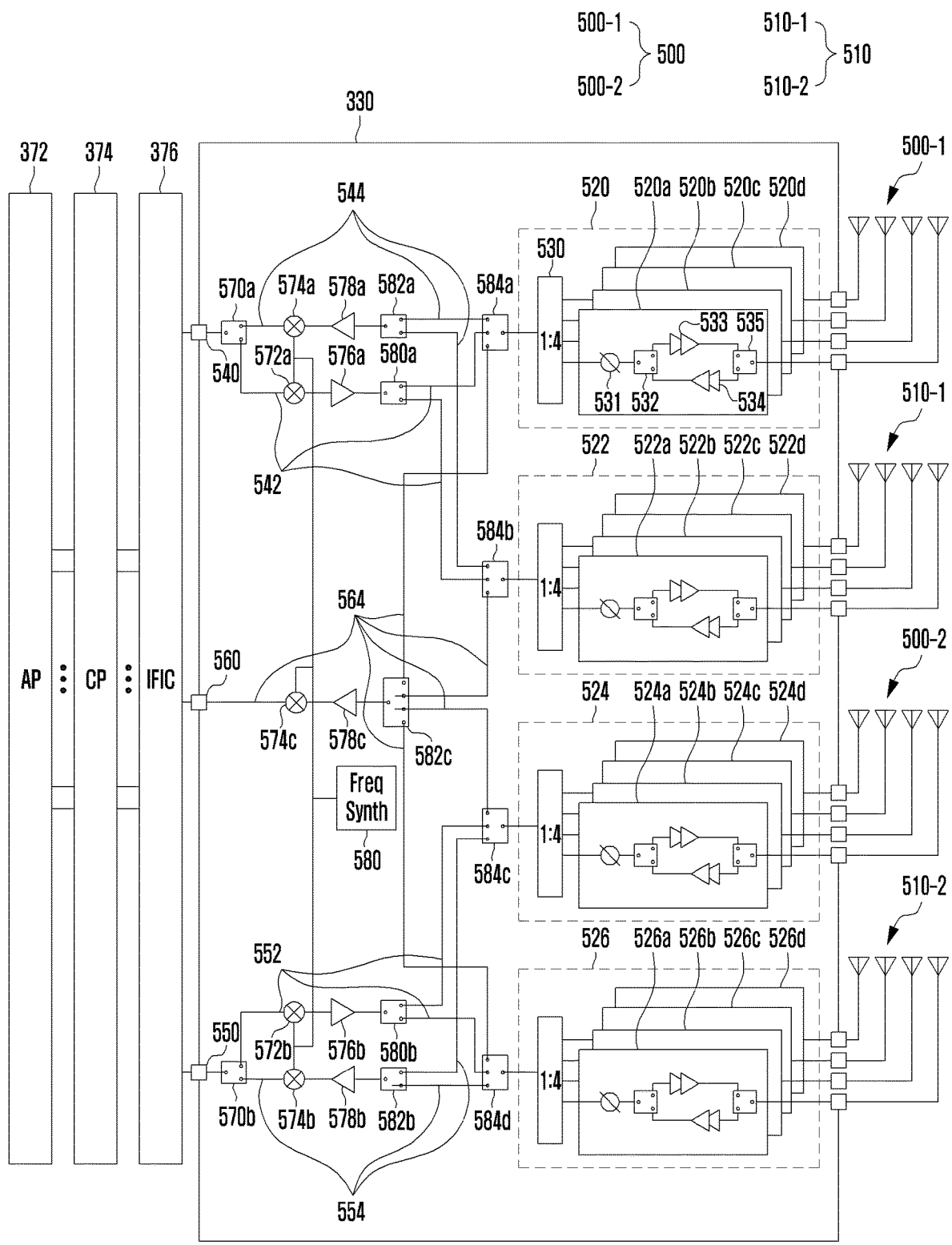
FIG. 5 is an example of a structure of a wireless communication circuit in the electronic device according to various example embodiments.
Figure 6A:
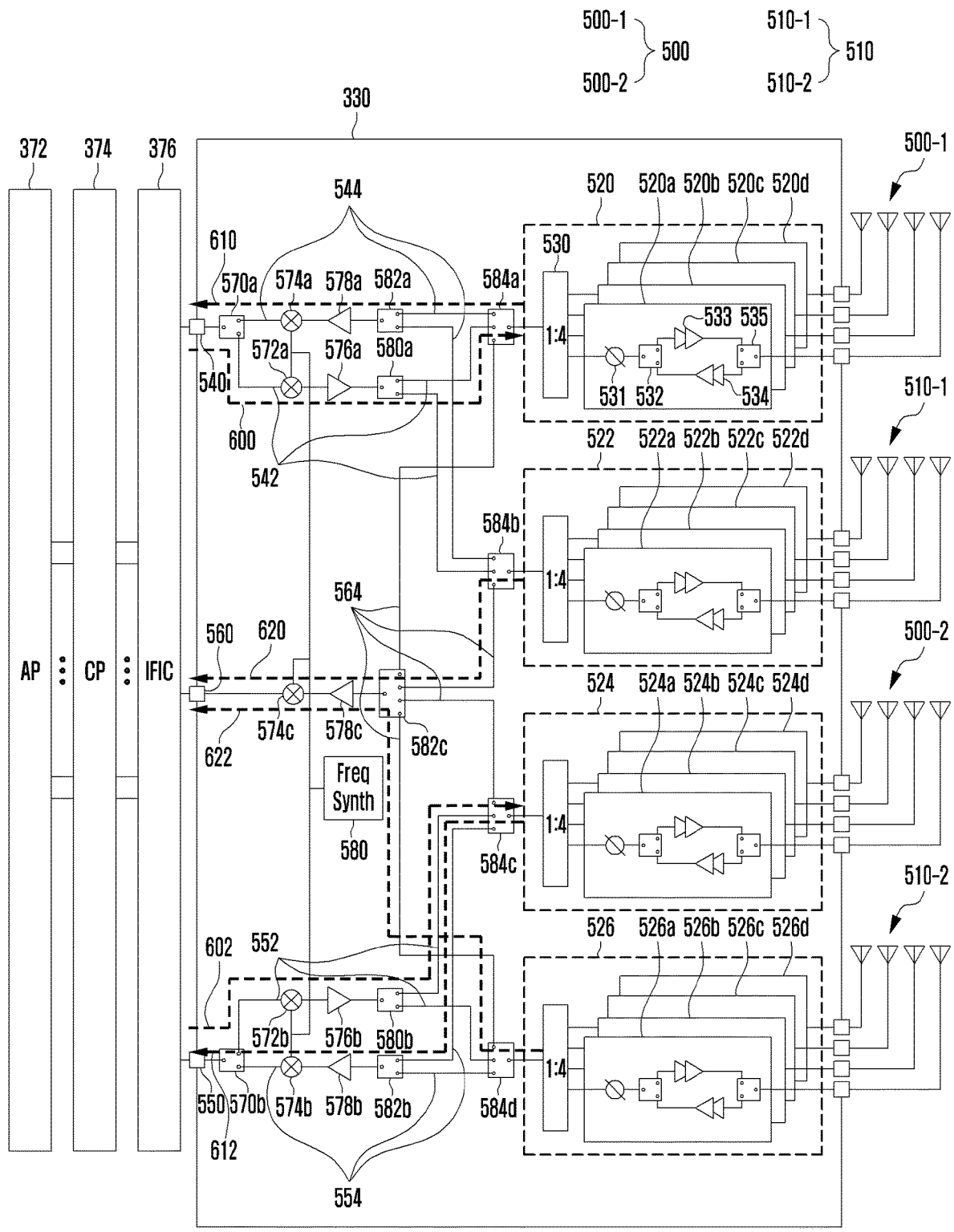
FIG. 6A is an example for monitoring a second array antenna in the electronic device according to various example embodiments.
Figure 6B:
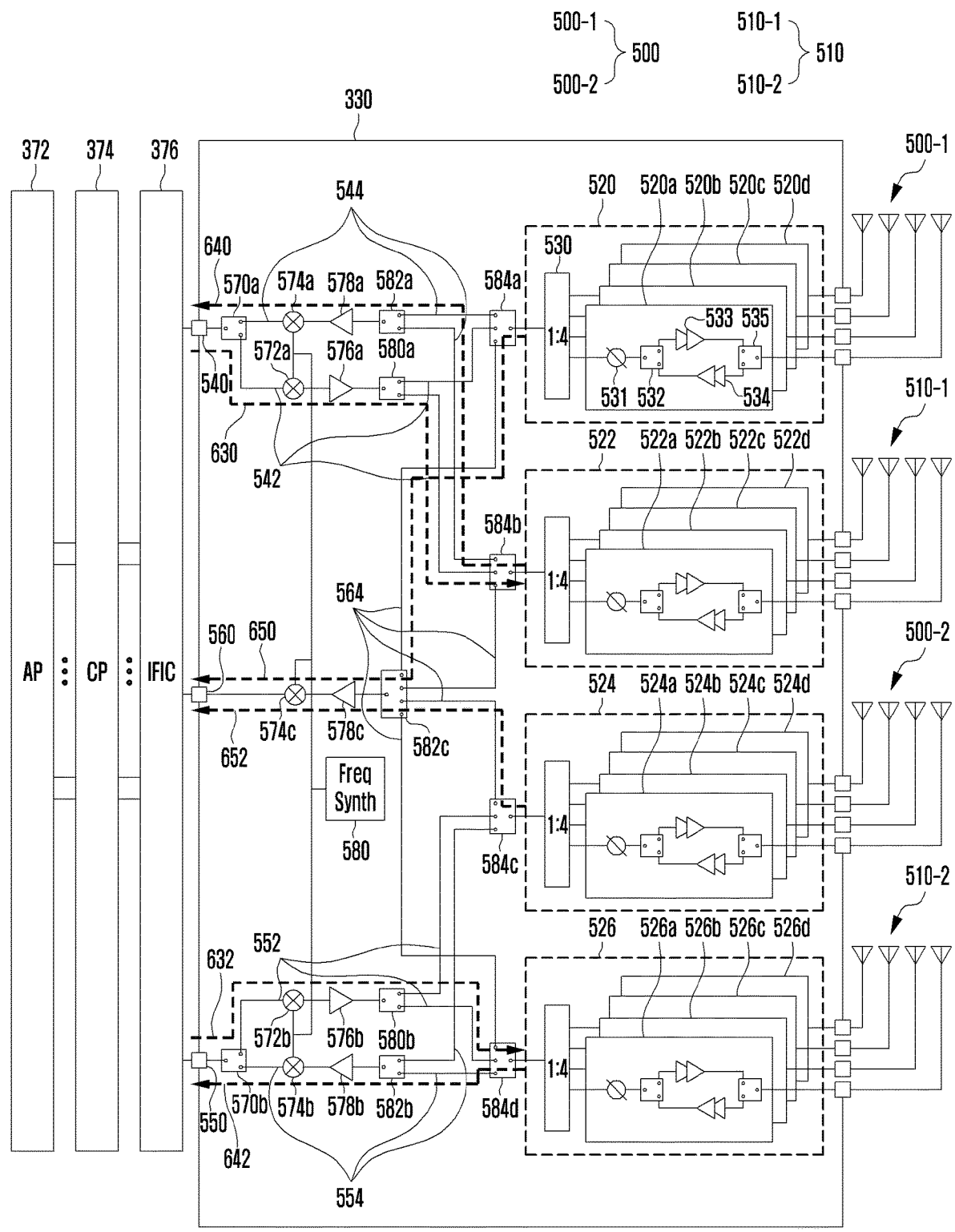
FIG. 6B is an example for monitoring a first array antenna in the electronic device according to various example embodiments.

FIG. 5 is an example of a structure of a wireless communication circuit in the electronic device according to various example embodiments. FIG. 6A is an example for monitoring a second array antenna in the electronic device according to various example embodiments. FIG. 6B is an example for monitoring a first array antenna in the electronic device according to various example embodiments. According to an example embodiment, the wireless communication circuit 330 of FIG. 5 may be at least partially similar to the third RFIC 226 of FIG. 2 or may include other embodiments.

Referring to FIG. 5, according to various example embodiments, a first antenna structure 500 (e.g., first antenna structure 320 of FIG. 3A and/or first antenna structure 420 of FIG. 4A) may transmit and/or receive an RF signal of a first polarization and/or an RF signal of a second polarization perpendicular to the first polarization. According to an example embodiment, the first antenna structure 500 (e.g., first antenna structure 320 of FIG. 3A and/or first antenna structure 420 of FIG. 4A) may transmit and/or receive signals of the first polarization via first power feeders electrically connected to the multiple first antenna elements (e.g., first antenna elements 322 of FIG. 3A or first antenna elements 422 of FIG. 4A). According to an example embodiment, the first antenna structure 500 (e.g., first antenna structure 320 of FIG. 3A or first antenna structure 420 of FIG. 4A) may transmit and/or receive signals of the second polarization via second power feeders electrically connected to the multiple first antenna elements (e.g., first antenna elements 322 of FIG. 3A or first antenna elements 422 of FIG. 4A). For example, the first power feeders or the second power feeders may be formed in an "X" power feeding polarization structure and/or a "+" power feeding polarization structure. For example, FIG. 5 may show a configuration in which a first array antenna 500-1 of the first polarization in the first antenna structure 500 is to transmit and/or receive a signal of the first polarization, and may show a configuration in which a first array antenna 500-2 of the second polarization in the first antenna structure 500 is to transmit and/or receive a signal of the second polarization. For example, the first array antenna 500-1 of the first polarization and the first array antenna 500-2 of the second polarization of FIG. 5 may logically divide and show, for convenience of explanation, a configuration for transmitting and/or receiving signals of a specific polarization via different power feeders in the first antenna elements corresponding to physically one element.

According to various example embodiments, a second antenna structure 510 (e.g., second antenna structure 350 of FIG. 3A and/or second antenna structure 450 of FIG. 4A) may transmit and/or receive an RF signal of a third polarization and/or an RF signal of a fourth polarization perpendicular to the third polarization. According to an example embodiment, the second antenna structure 510 (e.g., second antenna structure 350 of FIG. 3A or second antenna structure 450 of FIG. 4A) may transmit and/or receive signals of the third polarization via third power feeders electrically connected to the multiple second antenna elements (e.g., second antenna elements 352 of FIG. 3A or second antenna elements 452 of FIG. 4A). According to an example embodiment, the second antenna structure 500 (e.g., second antenna structure 350 of FIG. 3A and/or second antenna structure 450 of FIG. 4A) may transmit and/or receive signals of the fourth polarization via fourth power feeders electrically connected to the multiple second antenna elements (e.g., second antenna elements 352 of FIG. 3A and/or second antenna elements 452 of FIG. 4A). For example, the third power feeders or the fourth power feeders may be formed in an "X" power feeding polarization structure and/or a "+" power feeding polarization structure. For example, FIG. 5 may show a configuration in which a second array antenna 510-1 of the third polarization in the second antenna structure 510 is to transmit and/or receive a signal of the third polarization, and may show a configuration in which a second array antenna 510-2 of the fourth polarization in the second antenna structure 510 is to transmit and/or receive a signal of the fourth polarization. For example, the second array antenna 510-1 of the third polarization and the second array antenna 510-2 of the fourth polarization of FIG. 5 may logically divide and show, for convenience of explanation, a configuration for transmitting and/or receiving signals of a specific polarization via different power feeders in the second antenna elements corresponding to physically one element. For example, the third polarization may support substantially the same direction as that of the first polarization of the first antenna structure 500.

According to various example embodiments, a first RFFE 520 (e.g., third RFFE 236 of FIG. 2) may process an RF signal transmitted and/or received through the first array antenna 500-1 of the first polarization. According to an example embodiment, the first RFFE 520 may include a distribution/combination circuit 530 and multiple RF chains (e.g., first RF chain 520*a*, second RF chain 520*b*, third RF chain 520*c*, and/or fourth RF chain 520*d*) configured to process RF signals transmitted and/or received via multiple first antenna elements (e.g., first antenna elements 322 of FIG. 3A and/or first antenna elements 422 of FIG. 4A) included in the first array antenna 500-1 of the first polarization. For example, the first RF chain 520*a*, the second RF chain 520*b*, the third RF chain 520*c*, and/or the fourth RF chain 520*d* may be substantially the same, or may be different. In the following descriptions, a configuration of the first RF chain 520*a* is provided as an example, and descriptions for configurations of the second RF chain 520*b*, the third RF chain 520*c*, and/or the fourth RF chain 520*d* will be omitted, as they may be the same or similar.

According to various example embodiments, when transmission is performed, the distribution/combination circuit 530 may divide an RF signal received from a first transmission path 542 into multiple (e.g., four) RF signals and provide the same to the RF chains (520*a*, 520*b*, 520*c* and/or 520*d*) of the first RFFE 520. According to an example embodiment, the distribution/combination circuit 530 may provide the divided RF signals to the first RF chain 520*a*, the second RF chain 520*b*, the third RF chain 520*c*, and/or the fourth RF chain 520*d* of the first RFFE 520, which may correspond to multiple first antenna elements (e.g., first antenna elements 322 of FIG. 3A or first antenna elements 422 of FIG. 4A) included in the first array antenna 500-1 of the first polarization.

According to various example embodiments, when reception is performed, the distribution/combination circuit 530 may combine multiple RF signals received from the first RFFE 520 into one RF signal so as to provide the same to a first reception path 544. For example, the distribution/combination circuit 530 may combine multiple RF signals received via the first RF chain 520*a*, the second RF chain 520*b*, the third RF chain 520*c*, and/or the fourth RF chain 520*d* of the first RFFE 520 into one RF signal so as to provide the same to a first reception path 544.

According to various example embodiments, the first RF chain 520*a* may include a phase shifter 531, a power amplifier (PA) 533, and/or a low noise amplifier (LNA) 534. According to an example embodiment, the phase shifter 531 may adjust a phase of an RF signal input to the power amplifier 533 via a first switch 532, so as to output the phased-adjusted RF signal. For example, phase values adjusted by the phase shifter 531 may be phase values of signals transmitted through multiple first antenna elements (e.g., first antenna elements 322 of FIG. 3A or first antenna elements 422 of FIG. 4A) of the first array antenna 500-1 of the first polarization, and may be determined by a control signal. According to an example embodiment, the phase shifter 531 may adjust a phase of an RF signal received from the low noise power amplifier 534 via the first switch 532, so as to output the phase-adjusted RF signal. For example, phase values adjusted by the phase shifter 531 are phase values for changing of phases of RF signals transmitted through multiple first antenna elements (e.g., first antenna elements 322 of FIG. 3A or first antenna elements 422 of FIG. 4A) of the first array antenna 500-1 of the first polarization, and may be determined by a control signal. For example, the control signal may be input from another element (e.g., processor 120 of FIG. 1).

According to various example embodiments, the power amplifier 533 may amplify power of an RF signal received via the first switch 532. According to an example embodiment, the power amplifier 533 may amplify power of an RF signal provided by the phase shifter 531 via the first switch 532, so as to output the amplified RF signal to the first antenna elements of the first array antenna 500-1 of the first polarization via a second switch 535.

According to various example embodiments, the low noise power amplifier 534 may low noise amplify an RF signal received via the second switch 535, so as to output the low noise amplified RF signal. According to an example embodiment, the low noise amplifier 534 may low noise amplify RF signals received from the first antenna elements of the first array antenna 500-1 of the first polarization via the second switch 535, so as to output the low noise amplified RF signals to the phase shifter 531 and circuit 530 via the first switch 532.

According to various example embodiments, the first switch 532 may selectively connect the phase shifter 531 to the power amplifier 533 or the low noise amplifier 534. According to an example embodiment, when a signal is transmitted through the first array antenna 500-1 of the first polarization, the first switch 532 may connect the phase shifter 531 to the power amplifier 533 under a control of the CP 374 (or AP 372) (e.g., processor 120 of FIG. 1 or communication processor 212 and/or 214 of FIG. 2). According to an example embodiment, when a signal is received through the first array antenna 500-1 of the first polarization, the first switch 532 may connect the phase shifter 531 to the low noise amplifier 534 under a control of the CP 374 (or AP 372) (e.g., processor 120 of FIG. 1 and/or communication processor 212 or 214 of FIG. 2).

According to various example embodiments, the second switch 535 may selectively connect the first antenna elements of the first array antenna 500-1 of the first polarization to the power amplifier 533 or the low noise amplifier 534. According to an example embodiment, when a signal is transmitted through the first array antenna 500-1 of the first polarization, the second switch 535 may connect the power amplifier 533 to the first antenna elements of the first array antenna 500-1 of the first polarization under a control of the CP 374 (or AP 372) (e.g., processor 120 of FIG. 1 and/or communication processor 212 or 214 of FIG. 2). According to an example embodiment, when a signal is received through the first array antenna 500-1 of the first polarization, the second switch 535 may connect the low noise amplifier 534 to the first antenna elements of the first array antenna 500-1 of the first polarization under a control of the CP 374 (or AP 372) (e.g., processor 120 of FIG. 1 and/or communication processor 212 or 214 of FIG. 2).

According to various example embodiments, a second RFFE 524 (e.g., third RFFE 236 of FIG. 2) may process an RF signal transmitted and/or received through the first array antenna 500-2 of the second polarization. According to an example embodiment, the second RFFE 524 may include the distribution/combination circuit 530 and multiple RF chains (e.g., first RF chain 524*a*, second RF chain 524*b*, third RF chain 524*c*, and/or fourth RF chain 524*d*) configured to process RF signals transmitted and/or received via multiple first antenna elements (e.g., first antenna elements 322 of FIG. 3A or first antenna elements 422 of FIG. 4A) included in the first array antenna 500-2 of the second polarization. For example, the second RFFE 524 may operate similarly to the first RFFE 520 discussed above. Accordingly, in order to avoid descriptions overlapping with those for the first RFFE 520, detailed descriptions of the second RFFE 524 will be omitted.

According to various embodiments, a third RFFE 522 (e.g., third RFFE 236 of FIG. 2) may process an RF signal transmitted and/or received through the second array antenna 510-1 of the third polarization. According to an example embodiment, the third RFFE 522 may include the distribution/combination circuit 530 and multiple RF chains (e.g., first RF chain 522a, second RF chain 522b, third RF chain 522c, and/or fourth RF chain 522d) configured to process RF signals transmitted and/or received via multiple second antenna elements (e.g., second antenna elements 352 of FIG. 3A or second antenna elements 452 of FIG. 4A) included in the second array antenna 510-1 of the third polarization. For example, the third RFFE 522 may operate similarly to the first RFFE 520. Accordingly, in order to avoid descriptions overlapping with those for the first RFFE 520, detailed descriptions of the third RFFE 522 will be omitted.

According to various example embodiments, a fourth RFFE 526 (e.g., third RFFE 236 of FIG. 2) may process an RF signal transmitted and/or received through the second array antenna 510-2 of the fourth polarization. According to an example embodiment, the fourth RFFE 526 may include the distribution/combination circuit 530 and multiple RF chains (e.g., first RF chain 526a, second RF chain 526b, third RF chain 526c, and/or fourth RF chain 526d) configured to process RF signals transmitted and/or received via multiple second antenna elements (e.g., second antenna elements 352 of FIG. 3A or second antenna elements 452 of FIG. 4A) included in the second array antenna 510-2 of the fourth polarization. For example, the fourth RFFE 526 may operate similarly to the first RFFE 520. Accordingly, in order to avoid descriptions overlapping with those for the first RFFE 520, detailed descriptions of the fourth RFFE 526 will be omitted.

According to various example embodiments, the wireless communication circuit 330 may include a first input/output port 540, a second input/output port 550, and an output port 560. According to an example embodiment, the wireless communication circuit 330 may include a first transmission path 542 and a first reception path 544 between the first input/output port 540 and the first RFFE 520 and the third RFFE 522, a second transmission path 552 and a second reception path 554 between the second input/output port 550 and the second RFFE 524 and the fourth RFFE 526, and a third reception path 564 between the output port 560 and the first RFFE 520, the second RFFE 524, the third RFFE 522, and the fourth RFFE 526.

According to various example embodiments, the wireless communication circuit 330 may up-convert a transmission signal (e.g., IF signal) input through the first input/output port 540 and output the up-converted signal to the first RFFE 520 or the third RFFE 522 via the first transmission path 542. According to an example embodiment, as shown in FIG. 6A, when a signal is transmitted 600 through the first array antenna 500-1 of the first polarization, the wireless communication circuit 330 may connect the first input/output port 540 and the first transmission path 542 via a third switch 570a. A first mixer 572a may up-convert a transmission signal (e.g., IF signal), which is input from the first input/output port 540 via the third switch 570a, into a first RF signal on the basis of a first local oscillation frequency supplied from a local oscillator 580. The first RF signal up-converted by the first mixer 572a may be input to the first RFFE 520 via the first transmission buffer 576a, a fourth switch 580a, and a fifth switch 584a. For example, when the signal is transmitted 600 through the first array antenna 500-1 of the first polarization, the fourth switch 580a and/or the fifth switch 584a may connect the first transmission path 542 to the first RFFE 520 under a control of the CP 374 (or AP 372) (e.g., processor 120 of FIG. 1 or communication processor 212 or 214 of FIG. 2). For example, the first RF signal may be transmitted with a characteristic of the first polarization (e.g., vertical polarization) through the first array antenna 500-1 of the first polarization.

According to an example embodiment, as shown in FIG. 6B, when a signal is transmitted 630 through the second array antenna 510-1 of the third polarization, the wireless communication circuit 330 may connect the first input/output port 540 and the first transmission path 542 via the third switch 570a. The first mixer 572a may up-convert a transmission signal (e.g., IF signal), which is input from the first input/output port 540 via the third switch 570a, into a second RF signal on the basis of a second local oscillation frequency supplied from the local oscillator 580. The second RF signal up-converted by the first mixer 572a may be input to the third RFFE 522 via the first transmission buffer 576a, the fourth switch 580a, and a sixth switch 584b. For example, when the signal is transmitted 630 through the second array antenna 510-1 of the third polarization, the fourth switch 580a and/or the sixth switch 584b may connect the first transmission path 542 to the third RFFE 522 under a control of the CP 374 (or AP 372) (e.g., processor 120 of FIG. 1 or communication processor 212 or 214 of FIG. 2). For example, the second RF signal may be transmitted with a characteristic of the third polarization (e.g., vertical polarization) through the second array antenna 510-1 of the third polarization.

According to various example embodiments, the wireless communication circuit 330 may down-convert an RF signal received from the first RFFE 520 or the third RFFE 522 and output the down-converted RF signal to the first input/output port 540 via the first reception path 544. According to an embodiment, as shown in FIG. 6A, when a signal is received 610 through the first array antenna 500-1 of the first polarization, the wireless communication circuit 330 may connect the first input/output port 540 and the first reception path 544 via the third switch 570a. A second mixer 574a may down-convert a third RF signal input from the first RFFE 520 via the fifth switch 584a, a seventh switch 582a, and a first reception buffer 578a, based on a third local oscillation frequency supplied from the local oscillator 580. The signal (e.g., IF signal) down-converted by the second mixer 574a may be output to the first input/output port 540 via the third switch 570a. For example, when the signal is received 610 through the first array antenna 500-1 of the first polarization, the fifth switch 584a and/or the seventh switch 582a may connect the first reception path 544 to the first RFFE 520 under a control of the CP 374 (or AP 372) (e.g., processor 120 of FIG. 1 or communication processor 212 or 214 of FIG. 2). For example, the third RF signal is an RF signal having the characteristic of the first polarization (e.g., vertical polarization) and may be received using the first array antenna 500-1 of the first polarization.

According to an example embodiment, as shown in FIG. 6B, when a signal is received 640 through the second array antenna 510-1 of the third polarization, the wireless communication circuit 330 may connect the first input/output port 540 and the first reception path 544 via the third switch 570a. A second mixer 574a may down-convert a fourth RF signal input from the third RFFE 522 via the sixth switch

584b, the seventh switch 582a, and the first reception buffer 578a, based on a fourth local oscillation frequency supplied from the local oscillator 580. The signal (e.g., IF signal) down-converted by the second mixer 574a may be output to the first input/output port 540 via the third switch 570a. For example, when the signal is received 640 through the second array antenna 510-1 of the third polarization, the sixth switch 584b and/or the seventh switch 582a may connect the first reception path 544 to the third RFFE 522 under a control of the CP 374 (or AP 372) (e.g., processor 120 of FIG. 1 or communication processor 212 or 214 of FIG. 2). For example, the fourth RF signal is an RF signal having the characteristic of the first polarization (e.g., vertical polarization) and may be received using the second array antenna 510-1 of the third polarization.

According to various example embodiments, the wireless communication circuit 330 may up-convert a transmission signal (e.g., IF signal) input through the second input/output port 550 and output the up-converted signal to the second RFFE 524 or the fourth RFFE 526 via the second transmission path 552. According to an example embodiment, as shown in FIG. 6A, when a signal is transmitted 602 through the first array antenna 500-2 of the second polarization, the wireless communication circuit 330 may connect the second input/output port 550 and the second transmission path 552 via an eighth switch 570b. A third mixer 572b may up-convert a transmission signal (e.g., IF signal), which is input from the second input/output port 550 via the eighth switch 570b, into a fifth RF signal on the basis of the first local oscillation frequency supplied from the local oscillator 580. The fifth RF signal up-converted by the third mixer 572b may be input to the second RFFE 524 via a second transmission buffer 576b, a ninth switch 580b, and a 10th switch 584c. For example, when the signal is transmitted 602 through the first array antenna 500-2 of the second polarization, the ninth switch 580b and/or the 10th switch 584c may connect the second transmission path 552 to the second RFFE 524 under a control of the CP 374 (or AP 372) (e.g., processor 120 of FIG. 1 or communication processor 212 or 214 of FIG. 2). For example, the fifth RF signal may be transmitted with a characteristic of the second polarization (e.g., horizontal polarization) through the first array antenna 500-2 of the second polarization.

According to an example embodiment, as shown in FIG. 6B, when a signal is transmitted 632 through the second array antenna 510-2 of the fourth polarization, the wireless communication circuit 330 may connect the second input/output port 550 and the second transmission path 552 via the eighth switch 570b. The third mixer 572b may up-convert a transmission signal (e.g., IF signal), which is input from the second input/output port 550 via the eighth switch 570b, into a sixth RF signal on the basis of the second local oscillation frequency supplied from the local oscillator 580. The sixth RF signal up-converted by the third mixer 572b may be input to the fourth RFFE 526 via the second transmission buffer 576b, the ninth switch 580b, and an 11th switch 584d. For example, when the signal is transmitted 632 through the second array antenna 510-2 of the fourth polarization, the ninth switch 580b and/or the 11th switch 584d may connect the second transmission path 552 to the fourth RFFE 526 under a control of the CP 374 (or AP 372) (e.g., processor 120 of FIG. 1 or communication processor 212 or 214 of FIG. 2). For example, the sixth RF signal may be transmitted with a characteristic of the fourth polarization (e.g., horizontal polarization) through the second array antenna 510-2 of the fourth polarization.

According to various example embodiments, the wireless communication circuit 330 may down-convert an RF signal received from the second RFFE 524 or the fourth RFFE 526 and output the down-converted RF signal to the second input/output port 550 via the second reception path 554. According to an example embodiment, as shown in FIG. 6A, when a signal is received 612 through the first array antenna 500-2 of the second polarization, the wireless communication circuit 330 may connect the second input/output port 550 and the second reception path 554 via the eighth switch 570b. A fourth mixer 574b may down-convert a seventh RF signal input from the second RFFE 524 via the 10th switch 584c, a 12th switch 582b, and a second reception buffer 578b, based on the third local oscillation frequency supplied from the local oscillator 580. The signal (e.g., IF signal) down-converted by the fourth mixer 574b may be output to the second input/output port 550 via the eighth switch 570b. For example, when the signal is transmitted 612 through the first array antenna 500-2 of the second polarization, the 10th switch 584c and/or the 12th switch 582b may connect the second reception path 554 to the second RFFE 524 under a control of the CP 374 (or AP 372) (e.g., processor 120 of FIG. 1 or communication processor 212 or 214 of FIG. 2). For example, the seventh RF signal may be obtained by receiving an RF signal having the characteristic of the second polarization (e.g., horizontal polarization) through the first array antenna 500-2 of the second polarization.

According to an example embodiment, as shown in FIG. 6B, when a signal is received 642 through the second array antenna 510-2 of the fourth polarization, the wireless communication circuit 330 may connect the second input/output port 550 and the second reception path 554 via the eighth switch 570b. The fourth mixer 574b may down-convert an eighth RF signal input from the fourth RFFE 526 via the 11th switch 584d, the 12th switch 582b, and the second reception buffer 578b, based on the fourth local oscillation frequency supplied from the local oscillator 580. The signal (e.g., IF signal) down-converted by the fourth mixer 574b may be output to the second input/output port 550 via the eighth switch 570b. For example, when the signal is received 642 through the second array antenna 510-2 of the fourth polarization, the 11th switch 584d and/or the 12th switch 582b may connect the second reception path 554 to the fourth RFFE 526 under a control of the CP 374 (or AP 372) (e.g., processor 120 of FIG. 1 or communication processor 212 or 214 of FIG. 2). For example, the eighth RF signal may be obtained by receiving an RF signal having the characteristic of the fourth polarization (e.g., horizontal polarization) through the second array antenna 510-2 of the fourth polarization.

According to various example embodiments, the wireless communication circuit 330 may down-convert an RF signal received from the first RFFE 520, the second RFFE 524, the third RFFE 522, or the fourth RFFE 526 and output the down-converted RF signal to the output port 560 via the third reception path 564.

According to an example embodiment, as shown in FIG. 6A, when the signal is transmitted and/or received 600, 602, 610, and/or 612 through the first array antenna 500-1 of the first polarization and/or the first array antenna 500-2 of the second polarization, the CP 374 (or AP 372) may control the wireless communication circuit 330 to monitor the second array antenna 510-1 of the third polarization and/or the second array antenna 510-2 of the fourth polarization. For example, the CP 374 (or AP 372) may control the wireless communication circuit 330 so as to monitor the second array antenna 510-1 of the third polarization or the second array antenna 510-2 of the fourth polarization in different time intervals.

For example, as shown in FIG. 6A, when the CP 374 (or AP 372) monitors 620 the second array antenna 510-1 of the third polarization, the wireless communication circuit 330 may down-convert, via a fifth mixer 574c, the fourth RF signal input from the third RFFE 522. For example, the fifth mixer 574c may down-convert the fourth RF signal input from the third RFFE 522 via the sixth switch 584b, a 13th switch 582c, and a third reception buffer 578c, based on the fourth local oscillation frequency supplied from the local oscillator 580. The signal (e.g., IF signal) down-converted by the fifth mixer 574c may be output to the output port 560. For example, when the second array antenna 510-1 of the third polarization is monitored 620, the sixth switch 584b and/or the 13th switch 582c may connect the third reception path 564 to the third RFFE 522 under a control of the CP 374 (or AP 372) (e.g., processor 120 of FIG. 1 or communication processor 212 or 214 of FIG. 2). The CP 374 (or AP 372) may determine a reception signal strength or communication quality of the second array antenna 510-1 of the third polarization, based on a signal related to the second array antenna 510-1 of the third polarization, which has been received through the output port 560.

For example, as shown in FIG. 6A, when the CP 374 (or AP 372) monitors 622 the second array antenna 510-2 of the fourth polarization, the wireless communication circuit 330 may down-convert, via the fifth mixer 574c, the eighth RF signal input from the fourth RFFE 526. For example, the fifth mixer 574c may down-convert the eighth RF signal input from the fourth RFFE 526 via the 11th switch 584d, the 13th switch 582c, and the third reception buffer 578c, based on the fourth local oscillation frequency supplied from the local oscillator 580. The signal (e.g., IF signal) down-converted by the fifth mixer 574c may be output to the output port 560. For example, when the second array antenna 510-2 of the fourth polarization is monitored 622, the 11th switch 584d and/or the 13th switch 582c may connect the third reception path 564 to the fourth RFFE 526 under a control of the CP 374 (or AP 372) (e.g., processor 120 of FIG. 1 or communication processor 212 or 214 of FIG. 2). The CP 374 (or AP 372) may determine a reception signal strength or communication quality of the second array antenna 510-2 of the fourth polarization, based on a signal related to the second array antenna 510-2 of the fourth polarization, which has been received through the output port 560.

According to an example embodiment, as shown in FIG. 6B, when the signal is transmitted and/or received 630, 632, 640, and/or 642 through the second array antenna 510-1 of the third polarization and/or the second array antenna 510-2 of the fourth polarization, the CP 374 (or AP 372) may control the wireless communication circuit 330 so as to monitor the first array antenna 500-1 of the first polarization and/or the first array antenna 500-2 of the second polarization. For example, the CP 374 (or AP 372) may control the wireless communication circuit 330 so as to monitor the first array antenna 500-1 of the first polarization or the first array antenna 500-2 of the second polarization in different time intervals.

For example, as shown in FIG. 6B, when the CP 374 (or AP 372) monitors 650 the first array antenna 500-1 of the first polarization, the wireless communication circuit 330 may down-convert, via the fifth mixer 574c, the third RF signal input from the first RFFE 520. The fifth mixer 574c may down-convert the third RF signal input from the first RFFE 520 via the fifth switch 584a, the 13th switch 582c, and the third reception buffer 578c, based on the third local oscillation frequency supplied from the local oscillator 580. The signal (e.g., IF signal) down-converted by the fifth mixer 574c may be output to the output port 560. For example, when the first array antenna 500-1 of the first polarization is monitored 650, the fifth switch 584a and/or the 13th switch 582c may connect the third reception path 564 to the first RFFE 520 under a control of the CP 374 (or AP 372) (e.g., processor 120 of FIG. 1 or communication processor 212 or 214 of FIG. 2). The CP 374 (or AP 372) may determine a reception signal strength or communication quality of the first array antenna 500-1 of the first polarization, based on a signal related to the first array antenna 500-1 of the first polarization, which has been received through the output port 560.

For example, as shown in FIG. 6B, when the CP 374 (or AP 372) monitors 652 the first array antenna 500-2 of the second polarization, the wireless communication circuit 330 may down-convert, via the fifth mixer 574c, the seventh RF signal input from the second RFFE 524. For example, the fifth mixer 574c may down-convert the seventh RF signal input from the second RFFE 524 via the 10th switch 584c, the 13th switch 582c, and the third reception buffer 578c, based on the third local oscillation frequency supplied from the local oscillator 580. The signal (e.g., IF signal) down-converted by the fifth mixer 574c may be output to the output port 560. For example, when the first array antenna 500-2 of the second polarization is monitored 652, the 10th switch 584c and/or the 13th switch 582c may connect the third reception path 564 to the second RFFE 524 under a control of the CP 374 (or AP 372) (e.g., processor 120 of FIG. 1 or communication processor 212 or 214 of FIG. 2). The CP 374 (or AP 372) may determine a reception signal strength or communication quality of the first array antenna 500-2 of the second polarization, based on a signal related to the first array antenna 500-2 of the second polarization, which has been received through the output port 560.

According to various example embodiments, the local oscillator 580 may generate a local oscillation frequency for up-converting an intermediate frequency (IF) signal to an RF signal and/or down-converting an RF signal to an intermediate frequency (IF) signal. For example, the local oscillator 580 may have a structure of a phase lock loop (PLL) circuit including a voltage controlled oscillator (VCO).

According to various example embodiments, the wireless communication circuit 330 may monitor the first array antenna 500-1 and/or 500-2 and/or the second array antenna 510-1 and/or 510-2 using a separate reception path (e.g., third reception path 564 of FIG. 5), thereby reducing the number of wires for electrical connection to the IFIC 376.

According to various embodiments, the CP 374 may monitor the second antenna structure 510 while performing multi-antenna communication (MIMO: multiple input multiple output) with an external device (e.g., base station) via the first array antenna 500-1 of the first polarization and/or the first array antenna 500-2 of the second polarization of the first antenna structure 500.

According to various example embodiments, the CP 374 may monitor the second antenna structure 510 and the first array antenna 500-2 of the second polarization of the first antenna structure 500 while performing communication with an external device (e.g., base station) via the first array antenna 500-1 of the first polarization of the first antenna structure 500.

According to various embodiments, the CP 374 may monitor the first antenna structure 500 while performing multi-antenna communication (MIMO) with an external device (e.g., base station) via the second array antenna 510-1 of the third polarization and/or the second array antenna 510-2 of the fourth polarization of the second antenna structure 510.

According to various example embodiments, the CP 374 may monitor the first antenna structure 500 and the second array antenna 510-2 of the fourth polarization while performing communication with an external device (e.g., base station) via the second array antenna 510-1 of the third polarization of the second antenna structure 510.

According to various example embodiments, an electronic device (e.g., electronic device 101 of FIG. 1 or FIG. 2) may include: a first antenna structure (e.g., first antenna structure 320 of FIG. 3A, first antenna structure 420 of FIG. 4A, or first antenna structure 500 of FIG. 5) configured to form a first polarization and/or a second polarization perpendicular to the first polarization and include multiple first antenna elements (e.g., first antenna elements 322 of FIG. 3A or first antenna elements 422 of FIG. 4A), and a second antenna structure (e.g., second antenna structure 350 of FIG. 3A, second antenna structure 450 of FIG. 4A, or second antenna structure 510 of FIG. 5) configured to form a third polarization and/or a fourth polarization perpendicular to the third polarization and include multiple second antenna elements (e.g., second antenna elements 352 of FIG. 3A or second antenna elements 452 of FIG. 4A); and a wireless communication circuit (e.g., wireless communication circuit 330 of FIG. 3A, FIG. 4A, or FIG. 5) configured to transmit and/or receive radio frequency signals via the first antenna structure and the second antenna structure, wherein the wireless communication circuit includes: a first front-end circuit (e.g., first front-end circuit 520 of FIG. 5) configured to amplify power of a first radio frequency transmission signal to be transmitted via the first polarization of the first antenna structure, and low noise amplify a first radio frequency reception signal received via the first polarization of the first antenna structure; a second front-end circuit (e.g., third front-end circuit 522 of FIG. 5) configured to amplify power of a second radio frequency transmission signal to be transmitted via the third polarization of the second antenna structure, and low noise amplify a second radio frequency reception signal received via the third polarization of the second antenna structure; a third front-end circuit (e.g., second front-end circuit 524 of FIG. 5) configured to amplify power of a third radio frequency transmission signal to be transmitted via the second polarization of the first antenna structure, and low noise amplify a third radio frequency reception signal received via the second polarization of the first antenna structure; a fourth front-end circuit (e.g., fourth front-end circuit 526 of FIG. 5) configured to amplify power of a fourth radio frequency transmission signal to be transmitted via the fourth polarization of the second antenna structure, and low noise amplify a fourth radio frequency reception signal received via the fourth polarization of the second antenna structure; a first transmission path (e.g., first transmission path 542 of FIG. 5) configured to output the first radio frequency transmission signal or the second radio frequency transmission signal, which has been generated by up-converting a transmission signal input through a first input/output port (e.g., first input/output port 540 of FIG. 5) of the wireless communication circuit, to the first front-end circuit or the second front-end circuit; a first reception path (e.g., first reception path 544 of FIG. 5) configured to down-covert the first radio frequency reception signal or the second radio frequency reception signal, which has been output from the first front-end circuit or the second front-end circuit, so as to output the same to the first input/output port, and a second transmission path (e.g., second transmission path 552 of FIG. 5) configured to output the third radio frequency transmission signal or the fourth radio frequency transmission signal, which has been generated by up-converting a transmission signal input through a second input/output port (e.g., second input/output port 550 of FIG. 5) of the wireless communication circuit, to the third front-end circuit or the fourth front-end circuit; and a second reception path (e.g., second reception path 554 of FIG. 5) configured to down-convert the third radio frequency reception signal or the fourth radio frequency reception signal, which has been output from the third front-end circuit or the fourth front-end circuit, so as to output the same to the second input/output port, and a third reception path (e.g., third reception path 564 of FIG. 5) configured to down-convert the first radio frequency reception signal, the second radio frequency reception signal, the third radio frequency reception signal, or the fourth radio frequency reception signal, which has been output from the first front-end circuit, the second front-end circuit, the third front-end circuit, or the fourth front-end circuit, so as to output the same to an output port (e.g., output port 560 of FIG. 5) of the wireless communication circuit.

According to various example embodiments, the first antenna structure may include: a first board (e.g., first printed circuit board 310 of FIG. 3A); and the multiple first antenna elements disposed on the first board so as to form a beam in a first direction, and the second antenna structure may include: a second board (e.g., second printed circuit board 340 of FIG. 3A); and the multiple second antenna elements disposed on the second board so as to form a beam in a second direction different from the first direction.

According to various example embodiments, the first board may include a first surface (e.g., first surface 311 of FIG. 3A) and a second surface (e.g., second surface 312 of FIG. 3A) facing in a direction opposite to the first surface, and the multiple first antenna elements may be disposed on the first surface, and the wireless communication circuit may be disposed on the second surface.

According to various example embodiments, a housing; and a third board (e.g., third printed circuit board 370 of FIG. 3B or third printed circuit board 470 of FIG. 4A) disposed in the inner space of the housing are included, and the wireless communication circuit may be disposed on the third board and may be electrically connected to the first antenna structure and the second antenna structure.

According to various example embodiments, at least one processor (e.g., processor 120 of FIG. 1, communication processor 212 or 214 of FIG. 2, CP 374 of FIG. 5A, or AP 372 of FIG. 5A) may be further included, wherein the at least one processor is configured to, when a signal of the first polarization and/or second polarization of the first antenna structure is transmitted and/or received, monitor the third polarization and/or the fourth polarization of the second antenna structure on the basis of the down-converted second radio frequency reception signal or fourth radio frequency reception signal received through the output port.

According to various example embodiments, a switch (e.g., 13th switch 582c of FIG. 5) configured to connect the output port and the first front-end circuit, the second front-end circuit, the third front-end circuit, or the fourth front-end circuit may be further included, wherein the at least one processor is configured to control the switch to selectively connect the second front-end circuit or the fourth front-end circuit to the output port in order to monitor the third polarization and/or the fourth polarization of the second antenna structure.

According to various example embodiments, at least one processor may be further included, wherein the at least one processor is configured to, when a signal of the first polarization of the first antenna structure is transmitted and/or received, monitor the second polarization of the first antenna structure and the third polarization and/or the fourth polarization of the second antenna structure on the basis of the down-converted second radio frequency reception signal, third radio frequency reception signal, or fourth radio frequency reception signal received through the output port.

According to various example embodiments, a switch configured to connect the output port and the first front-end circuit, the second front-end circuit, the third front-end circuit, or the fourth front-end circuit may be further included, wherein the at least one processor is configured to control the switch to selectively connect the second front-end circuit, the third front-end circuit, or the fourth front-end circuit to the output port in order to monitor the second polarization of the first antenna structure and/or the third polarization and/or the fourth polarization of the second antenna structure.

According to various example embodiments, the wireless communication circuit may further include a first mixer (e.g., first mixer 572a of FIG. 5) disposed on the first transmission path and configured to generate the first radio frequency transmission signal or the second radio frequency transmission signal by up-converting a transmission signal input through the first input/output port, a first transmission buffer (e.g., first transmit buffer 576a of FIG. 5) configured to store an output of the first mixer, a second mixer (e.g., third mixer 572b of FIG. 5) disposed on the second transmission path and configured to generate the third radio frequency transmission signal or the fourth radio frequency transmission signal by up-converting a transmission signal input through the second input/output port, and a second transmission buffer (e.g., second transmission buffer 576b of FIG. 5) configured to store an output of the second mixer.

According to various example embodiments, the wireless communication circuit may further include a first reception buffer (e.g., first reception buffer 578a in FIG. 5) disposed on the first reception path, a third mixer (e.g., second mixer 574a of FIG. 5) configured to down-convert the first radio frequency reception signal or the second radio frequency reception signal, which has been received from the first front-end circuit or the second front-end circuit via the first reception buffer, a second reception buffer (e.g., second reception buffer 578b of FIG. 5) disposed on the second reception path, a fourth mixer (e.g., fourth mixer 574b of FIG. 5) configured to down-convert the third radio frequency reception signal or the fourth radio frequency reception signal, which has been received from the third front-end circuit or the fourth front-end circuit through the second reception buffer, a third reception buffer (e.g., third receive buffer 578c in FIG. 5) disposed on the third reception path, and a fifth mixer (e.g., fifth mixer 574c in FIG. 5) configured to down-convert the first radio frequency reception signal, the second radio frequency reception signal, the third radio frequency reception signal, or the fourth radio frequency reception signal, which has been received from the first front-end circuit, the second front-end circuit, the third front-end circuit, or the fourth front-end circuit through the third reception buffer.

Figure 7:
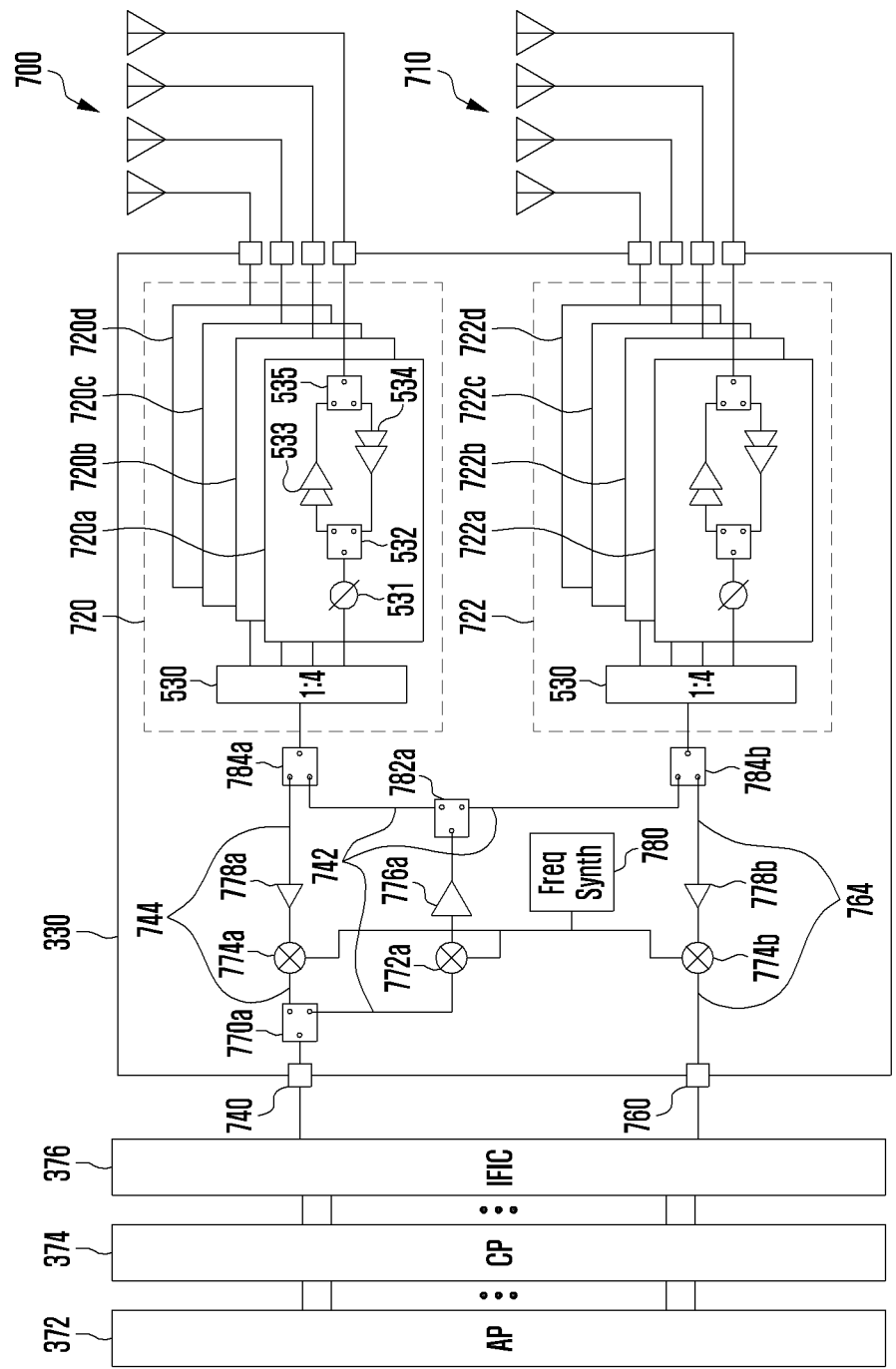
FIG. 7 is another example of a structure of the wireless communication circuit in the electronic device according to various example embodiments.
Figure 8A:
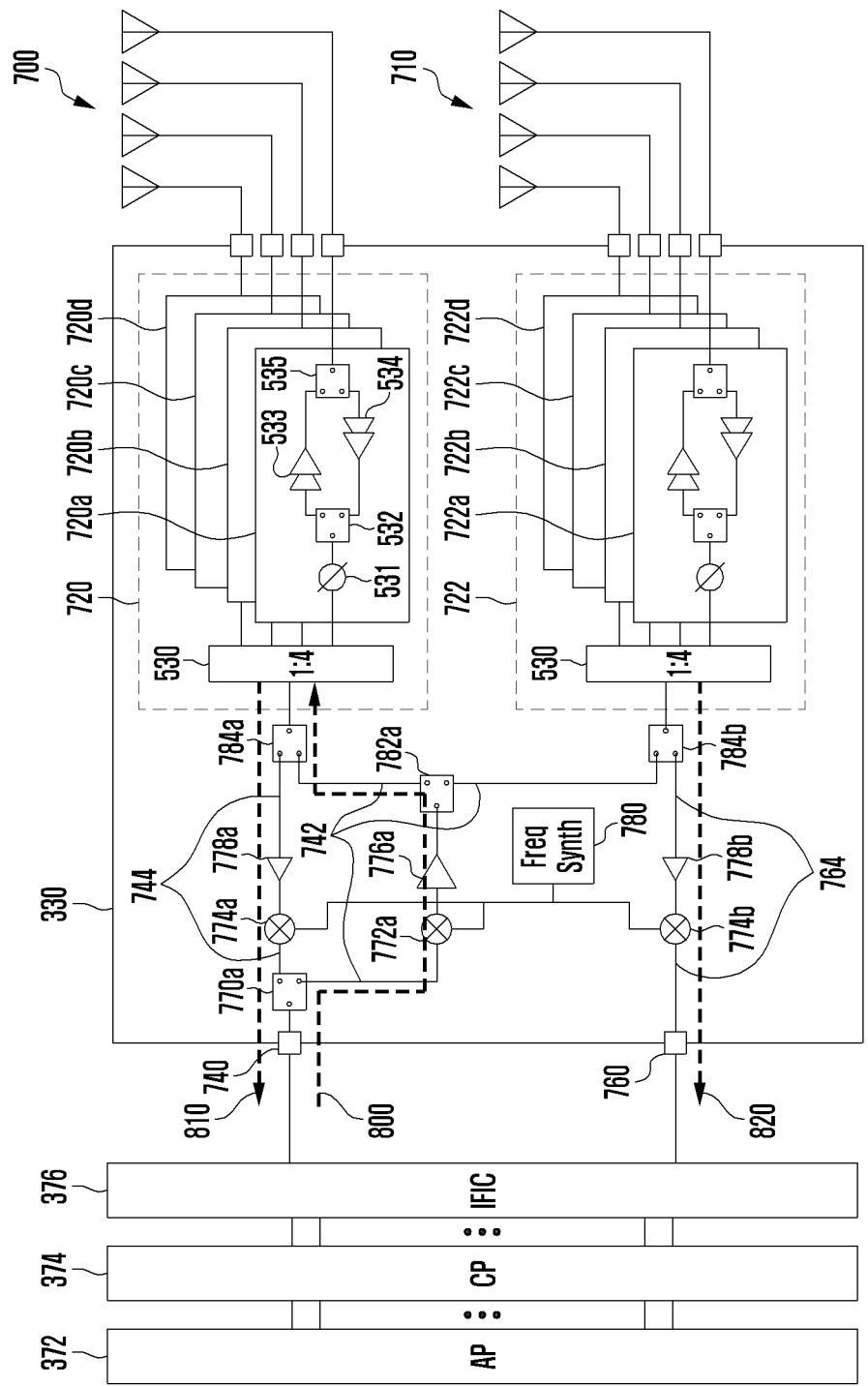
FIG. 8A is another example for monitoring a second array antenna in the electronic device according to various example embodiments.
Figure 8B:
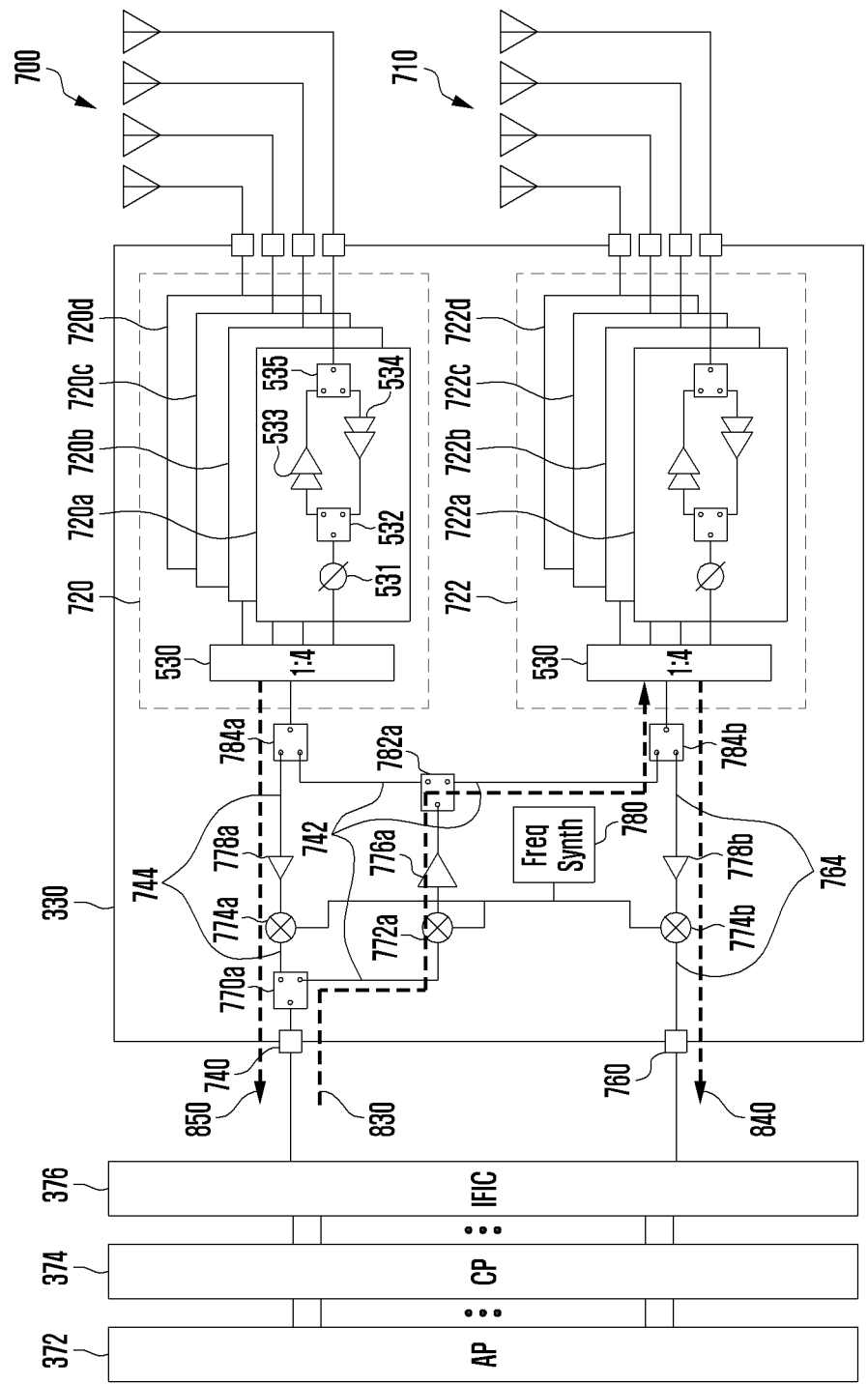
FIG. 8B is another example for monitoring a first array antenna in the electronic device according to various example embodiments.

FIG. 7 is another example of a structure of the wireless communication circuit in the electronic device according to various example embodiments. FIG. 8A is another example for monitoring a second array antenna in the electronic device according to various embodiments. FIG. 8B is another example for monitoring a first array antenna in the electronic device according to various embodiments. According to an example embodiment, the wireless communication circuit 330 of FIG. 7 may be at least partially similar to the third RFIC 226 of FIG. 2 or may include other embodiments.

Referring to FIG. 7, according to various example embodiments, the wireless communication circuit 330 may include a first RFFE 720 (e.g., third RFFE 236 of FIG. 2) configured to process an RF signal transmitted and/or received via a first antenna structure 700 (e.g., first antenna structure 320 of FIG. 3A or first antenna structure 420 of FIG. 4A), and a second RFFE 722 (e.g., third RFFE 236 of FIG. 2) configured to process an RF signal transmitted and/or received via a second antenna structure 710 (e.g., second antenna structure 350 of FIG. 3A or second antenna structure 450 of FIG. 4A). For example, the first antenna structure 700 is a first array antenna and may include multiple antenna elements (e.g., first antenna elements 322 of FIG. 3A or first antenna elements 422 of FIG. 4A) disposed to form a directional beam. For example, the second antenna structure 710 is a second array antenna and may include multiple antenna elements (e.g., second antenna elements 352 of FIG. 3A or second antenna elements 452 of FIG. 4A) disposed to form a directional beam.

According to various example embodiments, the first RFFE 720 (e.g., third RFFE 236 of FIG. 2) may process an RF signal transmitted and/or received through a first array antenna (e.g., first antenna structure 700). According to an example embodiment, the first RFFE 720 may include the distribution/combination circuit 530 and multiple RF chains (e.g., first RF chain 720a, second RF chain 720b, third RF chain 720c, and/or fourth RF chain 720d) configured to process RF signals transmitted and/or received via multiple first antenna elements (e.g., first antenna elements 322 of FIG. 3A or first antenna elements 422 of FIG. 4A) included in the first array antenna (e.g., the first antenna structure 700). For example, the first RFFE 720 of FIG. 7 may operate similarly to the first RFFE 520 of FIG. 5. Accordingly, in order to avoid descriptions overlapping with those for the first RFFE 520, detailed descriptions of the first RFFE 720 will be omitted.

According to various example embodiments, the second RFFE 722 (e.g., third RFFE 236 of FIG. 2) may process an RF signal transmitted and/or received via a second array antenna (e.g., second antenna structure 710). According to an embodiment, the second RFFE 722 may include the distribution/combination circuit 530 and multiple RF chains (e.g., first RF chain 722a, second RF chain 722b, third RF chain 722c, and/or fourth RF chain 722d) configured to process RF signals transmitted and/or received via multiple second antenna elements (e.g., second antenna elements 352 of FIG. 3A or second antenna elements 452 of FIG. 4A) included in the second array antenna (e.g., second antenna structure 710). For example, the second RFFE 722 of FIG. 7 may operate similarly to the first RFFE 520 of FIG. 5. Accordingly, in order to avoid descriptions overlapping with those for the first RFFE 520, detailed descriptions of the second RFFE 722 will be omitted.

According to various example embodiments, the wireless communication circuit 330 may include a first input/output port 740 and a first output port 760. According to an embodiment, the wireless communication circuit 330 may include a first transmission path 742 between the first input/output port 740 and the first RFFE 720 and the second RFFE 722, a first reception path 744 between the first input/output port 740 and the first RFFE 720, and a second reception path 764 between the first output port 760 and the second RFFE 722.

According to various example embodiments, the wireless communication circuit 330 may up-convert a transmission signal (e.g., IF signal) input through the first input/output port 740 and output the up-converted signal to the first RFFE 720 or the second RFFE 722 via the first transmission path 742. According to an embodiment, as shown in FIG. 8A, when a signal is transmitted 800 through the first array antenna (e.g., first antenna structure 700), the wireless communication circuit 330 may connect the first input/output port 740 and the first transmission path 742 via a third switch 770a. The first mixer 772a may up-convert a transmission signal (e.g., IF signal), which is input from the first input/output port 740 via the third switch 770a, into a first RF signal on the basis of a first local oscillation frequency supplied from a local oscillator 780. The first RF signal up-converted by the first mixer 772a may be input to the first RFFE 720 via a first transmission buffer 776a, a fourth switch 782a, and a fifth switch 784a. For example, when the signal is transmitted 800 through the first array antenna (e.g., first antenna structure 700), the fourth switch 782a and/or the fifth switch 784a may connect the first communication path 742 to the first RFFE 720 under a control of the CP 374 (or AP 372) (e.g., processor 120 of FIG. 1 or communication processor 212 or 214 of FIG. 2).

According to an example embodiment, as shown in FIG. 8B, when a signal is transmitted 830 through the second array antenna (e.g., second antenna structure 710), the wireless communication circuit 330 may connect the first input/output port 740 and the first transmission path 742 via the third switch 770a. The first mixer 772a may up-convert a transmission signal (e.g., IF signal), which is input from the first input/output port 740 via the third switch 770a, into a second RF signal on the basis of a second local oscillation frequency supplied from the local oscillator 780. The second RF signal up-converted by the first mixer 772a may be input to the second RFFE 722 via the first transmission buffer 776a, the fourth switch 782a, and a sixth switch 784b. For example, when the signal is transmitted 830 through the second array antenna (e.g., second antenna structure 710), the fourth switch 782a and/or the sixth switch 784b may connect the first transmission path 742 to the second RFFE 722 under a control of the CP 374 (or AP 372) (e.g., processor 120 of FIG. 1 or communication processor 212 or 214 of FIG. 2).

According to various example embodiments, the wireless communication circuit 330 may down-convert an RF signal received from the first RFFE 720 and output the down-converted RF signal to the first input/output port 740 via the first reception path 744. According to an embodiment, as shown in FIG. 8A, when a signal is received 810 through the first array antenna (e.g., first antenna structure 700), the wireless communication circuit 330 may connect the first input/output port 740 and the first reception path 744 via the third switch 770a. A second mixer 774a may down-convert a third RF signal input from the first RFFE 720 via the fifth switch 784a and a first reception buffer 778a, based on a third local oscillation frequency supplied from the local oscillator 780. The signal (e.g., IF signal) down-converted by the second mixer 774a may be output to the first input/output port 740 via the third switch 770a. For example, when the signal is received 810 through the first array antenna (e.g., first antenna structure 700), the fifth switch 784a may connect the first reception path 744 to the first RFFE 720 under a control of the CP 374 (or AP 372) (e.g., processor 120 of FIG. 1 or communication processor 212 or 214 of FIG. 2).

According to various example embodiments, as shown in FIG. 8A, when the signal is transmitted and/or received 800 and/or 810 through the first array antenna (e.g., first antenna structure 700), the CP 374 (or the AP 372) may control the wireless communication circuit 330 so as to monitor the second array antenna (e.g., second antenna structure 710). According to an embodiment, as shown in FIG. 8A, when the CP 374 (or AP 372) monitors 820 the second array antenna (e.g., second antenna structure 710), the wireless communication circuit 330 may down-convert, via a third mixer 774b, a fourth RF signal input from the second RFFE 722. For example, the third mixer 774b may down-convert the fourth RF signal input from the second RFFE 722 via the sixth switch 784b and a second reception buffer 778b, based on the fourth local oscillation frequency supplied from the local oscillator 780. The signal (e.g., IF signal) down-converted by the third mixer 774b may be output to the first output port 760. For example, when the second array antenna (e.g., second antenna structure 710) is monitored 820, the sixth switch 784b may connect the second reception path 764 to the second RFFE 722 under a control of the CP 374 (or AP 372) (e.g., processor 120 of FIG. 1 or communication processor 212 or 214 of FIG. 2). The CP 374 (or AP 372) may determine a reception signal strength or communication quality of the second array antenna (e.g., second antenna structure 710), based on a signal related to the second array antenna (e.g., second antenna structure 710), which has been received through the first output port 760.

According to various example embodiments, the wireless communication circuit 330 may down-convert an RF signal received from the second the fourth RFFE 722 and output the down-converted RF signal to the first output port 760 via the second reception path 764. According to an embodiment, as shown in FIG. 8B, when a signal is received 840 through the second array antenna (e.g., second antenna structure 710), the wireless communication circuit 330 may down-convert, via the third mixer 774b, the fourth RF signal input from the second RFFE 722. For example, the third mixer 774b may down-convert the fourth RF signal input from the second RFFE 722 via the sixth switch 784b and the second reception buffer 778b, based on the fourth local oscillation frequency supplied from the local oscillator 780. The signal (e.g., IF signal) down-converted by the third mixer 774b may be output to the first output port 760. For example, when the signal is received 840 through the second array antenna (e.g., second antenna structure 710), the sixth switch 784b may connect the second reception path 764 to the second RFFE 722 under a control of the CP 374 (or AP 372) (e.g., processor 120 of FIG. 1 or communication processor 212 or 214 of FIG. 2).

According to various example embodiments, as shown in FIG. 8B, when the signal is transmitted and/or received 830 and/or 840 through the second array antenna (e.g., second antenna structure 710), the CP 374 (or the AP 372) may control the wireless communication circuit 330 so as to monitor the first array antenna (e.g., first antenna structure 700). According to an embodiment, as shown in FIG. 8B, when the CP 374 (or the AP 372) monitors 850 the first array antenna (e.g., first antenna structure 700), the wireless communication circuit 330 may connect the first input/output port 740 and the first reception path 744 via the third switch 770a. A second mixer 774a may down-convert the third RF signal input from the first RFFE 720 via the fifth switch 784*a* and the first reception buffer 778*a*, based on the third local oscillation frequency supplied from the local oscillator 780. The signal (e.g., IF signal) down-converted by the second mixer 774*a* may be output to the first input/output port 740 via the third switch 770*a*. For example, when a signal is received 850 through the first array antenna (e.g., first antenna structure 700), the fifth switch 784*a* may connect the first reception path 744 to the first RFFE 720 under a control of the CP 374 (or AP 372) (e.g., processor 120 of FIG. 1 or communication processor 212 or 214 of FIG. 2). The CP 374 (or AP 372) may determine a reception signal strength or communication quality of the first array antenna (e.g., first antenna structure 700), based on a signal related to the first array antenna (e.g., first antenna structure 700), which has been received through the first input/output port 740.

According to various example embodiments, the wireless communication circuit 330 may reduce the complexity thereof for monitoring the first array antenna (e.g., first antenna structure 700) or the second array antenna (e.g., second antenna structure 710) by sharing a transmission path (e.g., first transmission path 742) of the first array antenna (e.g., first antenna structure 700) and the second array antenna (e.g., second antenna structure 710). According to an embodiment, the electronic device 101 may share a transmission path (e.g., first transmission path 742) of the first array antenna (e.g., first antenna structure 700) and the second array antenna (e.g., second antenna structure 710), thereby reducing elements (e.g., mixers and/or buffers) constituting the transmission path of the first array antenna (e.g., first antenna structure 700) and the second array antenna (e.g., second antenna structure 710).

Figure 9:
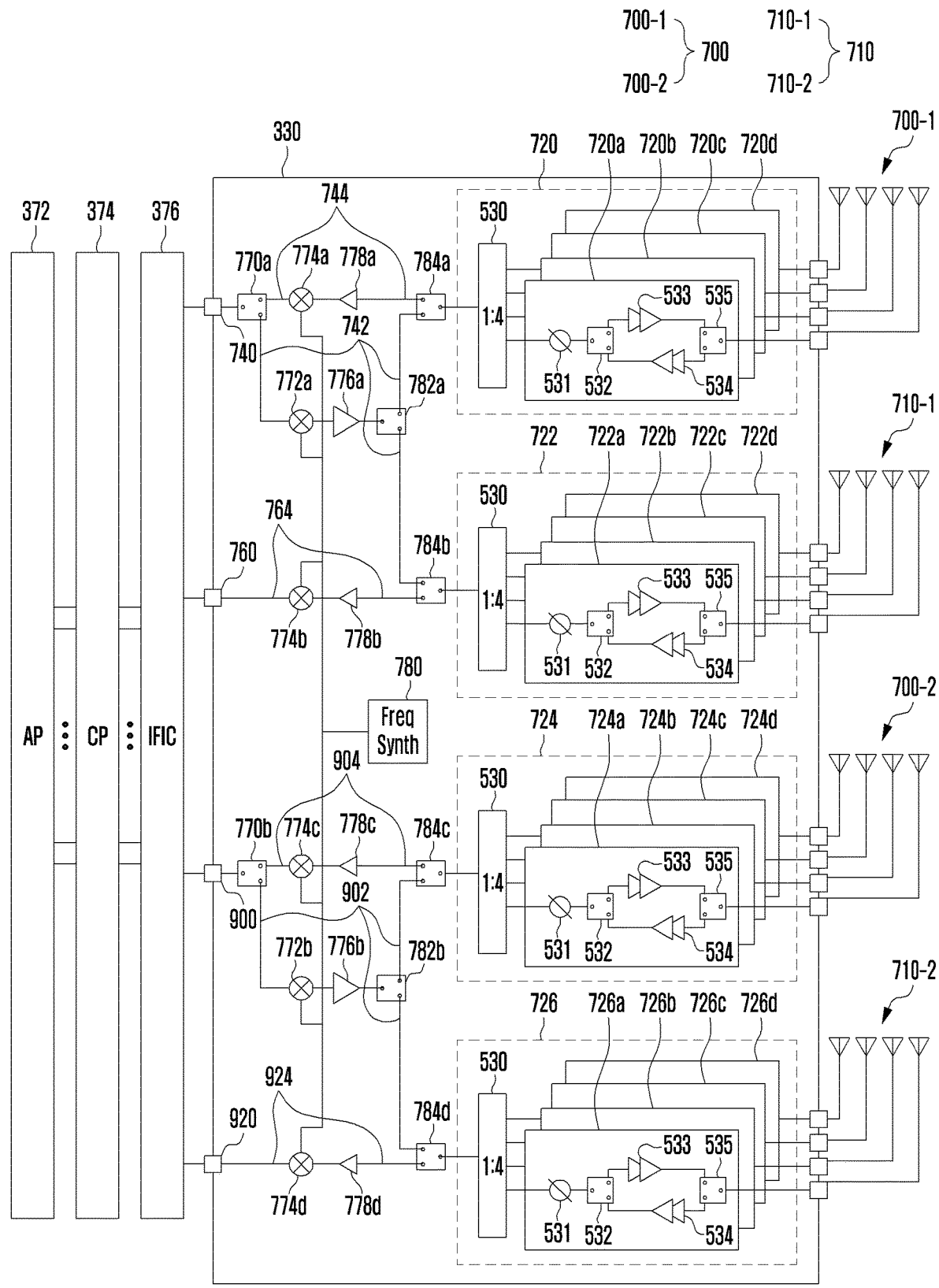
FIG. 9 is another example of a structure of the wireless communication circuit in the electronic device according to various example embodiments.

FIG. 9 is another example of a structure of the wireless communication circuit in the electronic device according to various embodiments. According to an embodiment, the wireless communication circuit 330 of FIG. 9 may be at least partially similar to the third RFIC 226 of FIG. 2 or may include other embodiments.

Referring to FIG. 9, according to various example embodiments, the first antenna structure 700 (e.g., first antenna structure 320 of FIG. 3A or first antenna structure 420 of FIG. 4A) may transmit and/or receive an RF signal of a first polarization and/or an RF signal of a second polarization perpendicular to the first polarization. For example, FIG. 9 may show, as a first array antenna 700-1 of the first polarization, a configuration for transmitting and/or receiving a signal of the first polarization in the first antenna structure 700 and may show, as a first array antenna 700-2 of the second polarization, a configuration for transmitting and/or receiving a signal of the second polarization in the first antenna structure 700. For example, the first array antenna 700-1 of the first polarization and the first array antenna 700-2 of the second polarization of FIG. 9 may logically divide and show, for convenience of explanation, a configuration for transmitting and/or receiving signals of a specific polarization via different power feeders in the first antenna structure 700 which is physically one element.

According to various example embodiments, the second antenna structure 710 (e.g., second antenna structure 350 of FIG. 3A or second antenna structure 450 of FIG. 4A) may transmit and/or receive an RF signal of a third polarization and/or an RF signal of a fourth polarization perpendicular to the third polarization. For example, FIG. 9 may show, as a second array antenna 710-1 of the third polarization, a configuration for transmitting and/or receiving a signal of the third polarization in the second antenna structure 710 and may show, as a second array antenna 710-2 of the fourth polarization, a configuration for transmitting and/or receiving a signal of the fourth polarization in the second antenna structure 710. For example, the second array antenna 710-1 of the third polarization and the second array antenna 710-2 of the fourth polarization of FIG. 9 may logically divide and show, for convenience of explanation, a configuration for transmitting and/or receiving signals of a specific polarization via different power feeders in the second antenna structure 710 which is physically one element. For example, the third polarization may support substantially the same direction as that of the first polarization of the first antenna structure 700.

According to various embodiments, the wireless communication circuit 330 may include a first RFFE 720 configured to process an RF signal transmitted and/or received through the first array antenna 700-1 of the first polarization, a second RFFE 722 configured to process an RF signal transmitted and/or received through the second array antenna 710-1 of the third polarization, a third RFFE 724 configured to process an RF signal transmitted and/or received through the first array antenna 700-2 of the second polarization, and fourth RFFE 726 configured to process an RF signal transmitted and/or received through the second array antenna 710-2 of the fourth polarization. For example, the first RFFE 720, the second RFFE 722, the third RFFE 724, and the fourth RFFE 726 of FIG. 9 may operate similarly to the first RFFE 520, the third RFFE 522, the second RFFE 524, and the fourth RFFE 526 of FIG. 5, respectively. Accordingly, in order to avoid descriptions overlapping with those for the first RFFE 520, the third RFFE 522, the second RFFE 524, and the fourth RFFE 526, detailed descriptions of the first RFFE 720, the second RFFE 722, the third RFFE 724, and the fourth RFFE 726 will be omitted.

According to various example embodiments, the wireless communication circuit 330 may include the first input/output port 740, a second input/output port 900, the first output port 760, and a second output port 920. According to an embodiment, the wireless communication circuit 330 may include the first transmission path 742 between the first input/output port 740 and the first RFFE 720 and the second RFFE 722, the first reception path 744 between the first input/output port 740 and the first RFFE 720, and the second reception path 764 between the first output port 760 and the second RFFE 722. For example, using the first transmission path 742, the first reception path 744, and the second reception path 764, a configuration for transmitting and/or receiving an RF signal using the first array antenna 700-1 of the first polarization and the second array antenna 710-1 of the third polarization and monitoring the first array antenna 700-1 of the first polarization and/or the second array antenna 710-1 of the third polarization may operate similarly to FIG. 7. Accordingly, detailed descriptions of a configuration for transmitting and/or receiving an RF signal using the first array antenna 700-1 of the first polarization and the second array antenna 710-1 of the third polarization and monitoring the first array antenna 700-1 of the first polarization and the second array antenna 710-1 of the third polarization will be omitted.

According to an example embodiment, the wireless communication circuit 330 may include a second transmission path 902 between the second input/output port 900 and the third RFFE 724 and the fourth RFFE 726, a third reception path 904 between the second input/output port 900 and the third RFFE 724, and/or a fourth reception path 924 between the second output port 920 and the fourth RFFE 726.

According to various example embodiments, the wireless communication circuit 330 may up-convert a transmission signal (e.g., IF signal) input through the second input/output port 900 and output the up-converted signal to the third RFFE 724 or the fourth RFFE 726 via the second transmission path 902. According to an example embodiment, when a signal is transmitted through the first array antenna 700-2 of the second polarization, the wireless communication circuit 330 may connect the second input/output port 900 and the second transmission path 902 via a seventh switch 770b. A fourth mixer 772b may up-convert a transmission signal (e.g., IF signal), which is input from the second input/output port 900 via the seventh switch 770b, into a fifth RF signal on the basis of the first local oscillation frequency supplied from the local oscillator 780. The fifth RF signal up-converted by the fourth mixer 772b may be input to the third RFFE 724 via a second transmission buffer 776b, an eighth switch 782b, and a ninth switch 784c. For example, when the signal is transmitted through the first array antenna 700-2 of the second polarization, the eighth switch 782b and/or the ninth switch 784c may connect the second transmission path 902 to the third RFFE 724 under a control of the CP 374 (or AP 372) (e.g., processor 120 of FIG. 1 or communication processor 212 or 214 of FIG. 2).

According to an example embodiment, when the signal is transmitted through the second array antenna 710-2 of the fourth polarization, the wireless communication circuit 330 may connect the second input/output port 900 and the second transmission path 902 via the seventh switch 770b. The fourth mixer 772b may up-convert a transmission signal (e.g., IF signal), which is input from the second input/output port 900 via the seventh switch 770b, into the second RF signal on the basis of the second local oscillation frequency supplied from the local oscillator 780. The sixth RF signal up-converted by the fourth mixer 772b may be input to the fourth RFFE 726 via the second transmission buffer 776b, the eighth switch 782b, and a 10th switch 784d. For example, when the signal is transmitted through the second array antenna 710-2 of the fourth polarization, the eighth switch 782b and/or the 10th switch 784d may connect the second transmission path 902 to the fourth RFFE 726 under a control of the CP 374 (or AP 372) (e.g., processor 120 of FIG. 1 or communication processor 212 or 214 of FIG. 2).

According to various example embodiments, the wireless communication circuit 330 may down-convert an RF signal received from the third RFFE 724 and output the down-converted RF signal to the second input/output port 900 via the third reception path 904. According to an example embodiment, when a signal is received through the first array antenna 700-2 of the second polarization, the wireless communication circuit 330 may connect the second input/output port 900 and the third reception path 904 via the seventh switch 770b. For example, a fifth mixer 774c may down-convert a seventh RF signal input from the third RFFE 724 via the ninth switch 784c and a third reception buffer 778c, based on the third local oscillation frequency supplied from the local oscillator 780. The signal (e.g., IF signal) down-converted by the fifth mixer 774c may be output to the second input/output port 900 via the seventh switch 770b. For example, when the signal is received through the first array antenna 700-2 of the second polarization, the ninth switch 784c may connect the third reception path 904 to the third RFFE 724 under a control of the CP 374 (or AP 372) (e.g., processor 120 of FIG. 1 or communication processor 212 or 214 of FIG. 2).

According to various example embodiments, when the signal is transmitted and/or received through the first array antenna 700-2 of the second polarization, the CP 374 (or AP 372) may control the wireless communication circuit 330 so as to monitor the second array antenna 710-2 of the fourth polarization. According to an example embodiment, when the CP 374 (or AP 372) monitors the second array antenna 710-2 of the fourth polarization, the wireless communication circuit 330 may down-convert, via a sixth mixer 774d, the fourth RF signal input from the fourth RFFE 726. For example, the sixth mixer 774d may down-convert an eighth RF signal input from the fourth RFFE 726 via the 10th switch 784d and a fourth reception buffer 778d, based on the fourth local oscillation frequency supplied from the local oscillator 780. The signal (e.g., IF signal) down-converted by the sixth mixer 774d may be output to the second output port 920. For example, when the second array antenna 710-2 of the fourth polarization is monitored, the 10th switch 784d may connect the fourth reception path 924 to the fourth RFFE 726 under a control of the CP 374 (or AP 372) (e.g., processor 120 of FIG. 1 or communication processor 212 or 214 of FIG. 2). The CP 374 (or AP 372) may determine a reception signal strength or communication quality of the second array antenna 710-2 of the fourth polarization, based on a signal related to the second array antenna 710-2 of the fourth polarization, which has been received through the second output port 920.

According to various example embodiments, the wireless communication circuit 330 may down-convert an RF signal received from the fourth RFFE 726 and output the down-converted RF signal to the second output port 920 via the fourth reception path 924. According to an example embodiment, when a signal is received through the second array antenna 710-2 of the fourth polarization, the wireless communication circuit 330 may down-convert, via the sixth mixer 774d, the eighth RF signal input from the fourth RFFE 726. For example, the sixth mixer 774d may down-convert an eighth RF signal input from the fourth RFFE 726 via the 10th switch 784d and the fourth reception buffer 778d, based on the fourth local oscillation frequency supplied from the local oscillator 780. The signal (e.g., IF signal) down-converted by the sixth mixer 774d may be output to the second output port 920. For example, when the signal is received 840 through the second array antenna 710-2 of the fourth polarization, the 10th switch 784d may connect the fourth reception path 924 to the fourth RFFE 726 under a control of the CP 374 (or AP 372) (e.g., processor 120 of FIG. 1 or communication processor 212 or 214 of FIG. 2).

According to various embodiments, when the signal is transmitted and/or received through the second array antenna 710-2 of the fourth polarization, the CP 374 (or the AP 372) may control the wireless communication circuit 330 so as to monitor the first array antenna 700-2 of the second polarization. According to an embodiment, when the CP 374 (or the AP 372) monitors the first array antenna 700-2 of the second polarization, the wireless communication circuit 330 may connect the second input/output port 900 and the third reception path 904 via the seventh switch 770b. The fifth mixer 774c may down-convert the seventh RF signal input from the third RFFE 724 via the ninth switch 784c and the third reception buffer 778c, based on the third local oscillation frequency supplied from the local oscillator 780. The signal (e.g., IF signal) down-converted by the fifth mixer 774c may be output to the second input/output port 900 via the seventh switch 770b. For example, when the signal is received 810 through the first array antenna 700-2 of the second polarization, the ninth switch 784c may connect the third reception path 904 to the third RFFE 724 under a control of the CP 374 (or AP 372) (e.g., processor 120 of FIG. 1 or communication processor 212 or 214 of FIG. 2). The CP 374 (or AP 372) may determine a reception signal strength or communication quality of the first array antenna 700-2 of the second polarization, based on a signal related to the first array antenna 700-2 of the second polarization, which has been received through the second input/output port 900.

According to various example embodiments, the wireless communication circuit 330 may reduce the complexity thereof for monitoring the first array antenna 700-2 of the second polarization or the second array antenna 710-2 of the fourth polarization by sharing a transmission path (e.g., second transmission path 902) of the first array antenna 700-2 of the second polarization and the second array antenna 710-2 of the fourth polarization. According to an example embodiment, the electronic device 101 may share a transmission path (e.g., second transmission path 902) of the first array antenna 700-2 of the second polarization and the second array antenna 710-2 of the fourth polarization, thereby reducing elements (e.g., mixers and/or buffers) constituting the transmission path of the first array antenna 700-2 of the second polarization and the second array antenna 710-2 of the fourth polarization.

According to various example embodiments, when multi-antenna communication (MIMO: multiple input multiple output) is performed with an external device (e.g., base station) via the first array antenna 700-1 of the first polarization and the first array antenna 700-2 of the second polarization, the CP 374 (or AP 372) may monitor the second array antenna 710-1 of the third polarization and/or the second array antenna 710-2 of the fourth polarization, based on a signal received through the first output port 760 and/or the second output port 920 of the wireless communication circuit 330.

According to various example embodiments, when multi-antenna communication (MIMO) is performed with an external device (e.g., base station) via the second array antenna 710-1 of the third polarization and the second array antenna 710-2 of the fourth polarization, the CP 374 (or AP 372) may monitor the first array antenna 700-1 of the first polarization and/or the first array antenna 700-2 of the second polarization, based on a signal received through the first input/output port 740 and/or the second input/output port 900 of the wireless communication circuit 330.

According to various example embodiments, when communication is performed with an external device (e.g., base station) via the first array antenna 700-1 of the first polarization, the CP 374 (or AP 372) may monitor the first array antenna 700-2 of the second polarization, the second array antenna 710-1 of the third polarization, and/or the second array antenna 710-2 of the fourth polarization, based on a signal provided through the first output port 760, the second input/output port 900, and/or the second output port 920 of the wireless communication circuit 330.

According to various example embodiments, an electronic device (e.g., electronic device 101 of FIG. 1 or FIG. 2) may include: a first antenna structure (e.g., first antenna structure 320 of FIG. 3A, first antenna structure 420 of FIG. 4A, or first antenna structure 700 of FIG. 7) including multiple first antenna elements (e.g., first antenna elements 322 of FIG. 3A or first antenna elements 422 of FIG. 4A), and a second antenna structure (e.g., second antenna structure 350 of FIG. 3A, second antenna structure 450 of FIG. 4A, or second antenna structure 710 of FIG. 7) including multiple second antenna elements (e.g., second antenna elements 352 of FIG. 3A or second antenna elements 452 of FIG. 4A); and a wireless communication circuit (e.g., wireless communication circuit 330 of FIG. 3A, FIG. 4A, FIG. 7, or FIG. 9) configured to transmit and/or receive radio frequency signals via the first antenna structure and the second antenna structure, wherein the wireless communication circuit includes: a first front-end circuit (e.g., first front-end circuit 720 of FIG. 7 or FIG. 9) configured to amplify power of a first radio frequency transmission signal to be transmitted via the first antenna structure and low noise amplify a first radio frequency reception signal received via the first antenna structure; a second front-end circuit (e.g., second front-end circuit 722 of FIG. 7 or FIG. 9) configured to amplify power of a second radio frequency transmission signal to be transmitted via the second antenna structure and low noise amplify a second radio frequency reception signal received via the second antenna structure; a first transmission path (e.g., first transmission path 742 of FIG. 7 or FIG. 9) configured to output the first radio frequency transmission signal or the second radio frequency transmission signal, which has been generated by up-converting a transmission signal input through a first input/output port (e.g., first input/output port 740 of FIG. 7 or FIG. 9) of the wireless communication circuit, to the first front-end circuit or the second front-end circuit; and a first reception path (e.g., first reception path 744 of FIG. 7 or FIG. 9) configured to down-convert the first radio frequency reception signal output from the first front-end circuit so as to output the same to the first input/output port, and a second reception path (e.g., second reception path 764 of FIG. 7 or FIG. 9) configured to down-convert the second radio frequency reception signal output from the second front-end circuit so as to output the same to a first output port (e.g., first output port 760 of FIG. 7 or FIG. 9) of the wireless communication circuit.

According to various example embodiments, at least one processor (e.g., processor 120 of FIG. 1, communication processor 212 or 214 of FIG. 2, CP 374 of FIG. 5A, or AP 372 of FIG. 5A) may be further included, wherein the at least one processor is configured to, when a signal is transmitted and/or received via the first antenna structure, monitor the second antenna structure on the basis of the down-converted second radio frequency reception signal received through the first output port.

According to various example embodiments, the first antenna structure may form a first polarization and/or a second polarization perpendicular to the first polarization via the multiple first antenna elements, and the second antenna structure may form a third polarization and/or a fourth polarization perpendicular to the third polarization via the multiple second antenna elements.

According to various example embodiments, the first front-end circuit may be configured to amplify power of the first radio frequency transmission signal to be transmitted via the first polarization of the first antenna structure, and low noise amplify the first radio frequency reception signal received through the first polarization of the first antenna structure, and the second front-end circuit may be configured to amplify power of the second radio frequency transmission signal to be transmitted via the third polarization of the second antenna structure, and low noise amplify the second radio frequency reception signal received through the third polarization of the second antenna structure.

According to various example embodiments, the wireless communication circuit may further include: a third front-end circuit (e.g., third front-end circuit 724 of FIG. 9) configured to amplify power of a third radio frequency transmission signal to be transmitted via the second polarization of the first antenna structure, and low noise amplify a third radio frequency reception signal received via the second polarization of the first antenna structure; a fourth front-end circuit (e.g., fourth front-end circuit 726 of FIG. 9) configured to amplify power of a fourth radio frequency transmission signal to be transmitted via the fourth polarization of the second antenna structure, and low noise amplify a fourth radio frequency reception signal received via the fourth polarization of the second antenna structure; a second transmission path (e.g., second transmission path 902 in FIG. 9) configured to output the third radio frequency transmission signal or the fourth radio frequency transmission signal, which has been generated by up-converting a transmission signal input through the second input/output port (e.g., second input/output port 900 of FIG. 9) of the wireless communication circuit, to the third front-end circuit or the fourth front-end circuit; and a third reception path (e.g., third reception path 904 of FIG. 9) configured to down-convert the third radio frequency reception signal output from the third front-end circuit so as to output the same to the second input/output port, and a fourth reception path (e.g., fourth receive path 924 of FIG. 9) configured to down-convert the fourth radio frequency reception signal output from the fourth front-end circuit so as to output the same to a second output port (e.g., second output port 920 of FIG. 9) of the wireless communication circuit.

According to various example embodiments, the first antenna structure may include: a first board (e.g., first printed circuit board 310 of FIG. 3A); and the multiple first antenna elements disposed on the first board so as to form a beam in a first direction, and the second antenna structure may include: a second board (e.g., second printed circuit board 340 of FIG. 3A); and the multiple second antenna elements disposed on the second board so as to form a beam in a second direction different from the first direction.

According to various example embodiments, the first board may include a first surface (e.g., first surface 311 of FIG. 3A) and a second surface (e.g., second surface 312 of FIG. 3A) facing in a direction opposite to the first surface, and the multiple first antenna elements may be disposed on the first surface, and the wireless communication circuit may be disposed on the second surface.

According to various example embodiments, a housing; and a third board (e.g., third printed circuit board 370 of FIG. 3B or third printed circuit board 470 of FIG. 4A) disposed in the inner space of the housing are included, and the wireless communication circuit may be disposed on the third board and may be electrically connected to the first antenna structure and the second antenna structure.

According to various example embodiments, the wireless communication circuit may further include a first mixer (e.g., first mixer 772*a* of FIG. 7 or FIG. 9) disposed on the first transmission path and configured to up-convert a transmission signal input via the first input/output port so as to generate the first radio frequency transmission signal or the second radio frequency transmission signal, and a transmission buffer (e.g., first transmission buffer 776*a* of FIG. 7 or FIG. 9) configured to store an output of the first mixer.

According to various example embodiments, the wireless communication circuit may further include a first reception buffer (e.g., first reception buffer 778*a* of FIG. 7 or 9) disposed on the first receive path, a second mixer (e.g., second mixer 774*a* of FIG. 7 or FIG. 9) configured to down-convert the first radio frequency reception signal received from the first front-end circuit through the first reception buffer, a second reception buffer (e.g., second reception buffer 778*b* of FIG. 7 or 9) disposed on the second receive path, and a third mixer (e.g., third mixer 774*b* of FIG. 7 or FIG. 9) configured to down-convert the second radio frequency reception signal received from the second front-end circuit through the second reception buffer.

The example embodiments of the disclosure described and shown in the specification and the drawings have been presented to easily explain the technical contents of embodiments of the disclosure and help understanding of embodiments the disclosure, and are not intended to limit the scope of embodiments of the disclosure. Therefore, the scope of various embodiments of the disclosure should be construed to include, in addition to the embodiments disclosed herein, all changes and modifications derived on the basis of the technical idea of various embodiments of the disclosure.

What is claimed is:

1. An electronic device comprising:
  a first antenna structure configured to form a vertical polarization and a horizontal polarization perpendicular to the vertical polarization and comprising multiple first antenna elements,
  a second antenna structure configured to form the vertical polarization and the horizontal polarization perpendicular to the vertical polarization and comprising multiple second antenna elements; and
  wireless communication circuitry configured to transmit and receive a radio frequency signal via the first antenna structure and the second antenna structure,
  wherein the wireless communication circuit comprises:
  first front-end circuitry configured to amplify power of a first radio frequency transmission signal to be transmitted via the vertical polarization of the first antenna structure, and amplify a first radio frequency reception signal received via the vertical polarization of the first antenna structure;
  second front-end circuitry configured to amplify power of a second radio frequency transmission signal to be transmitted via the vertical polarization of the second antenna structure, and amplify a second radio frequency reception signal received via the vertical polarization of the second antenna structure;
  third front-end circuitry configured to amplify power of a third radio frequency transmission signal to be transmitted via the horizontal polarization of the first antenna structure, and amplify a third radio frequency reception signal received via the horizontal polarization of the first antenna structure;
  fourth front-end circuitry configured to amplify power of a fourth radio frequency transmission signal to be transmitted via the horizontal polarization of the second antenna structure, and amplify a fourth radio frequency reception signal received via the horizontal polarization of the second antenna structure;
  a first switch configured to connect a first shared transmission path to the first front-end circuitry or the second front-end circuitry;
  a second switch configured to connect a first shared reception path to the first front-end circuitry or the second front-end circuitry;
  a third switch configured to connect a second shared transmission path to the third front- end circuitry or the fourth front-end circuitry;
  a fourth switch configured to connect a second shared reception path to the third front- end circuitry or the fourth front-end circuitry;
  a fifth switch configured to connect a third shared reception path to the first front-end circuitry, the second front-end circuitry, the third front-end circuitry or the fourth front-end circuitry;

the first shared transmission path including a first mixer and configured to provide in a first state of the first switch the first radio frequency transmission signal, which has been generated by up-converting a transmission signal input through a first input/output port of the wireless communication circuitry using the first mixer, to the first front-end circuitry and to provide in a second state of the first switch the second radio frequency transmission signal, which has been generated by up-converting a transmission signal input through the first input/output port of the wireless communication circuitry using the first mixer, to the second front-end circuitry;

the first shared reception path including a second mixer configured to down-covert, using the second mixer, in a first state of the second switch the first radio frequency reception signal, which has been output from the first front-end circuitry, so as to provide the same to the first input/output port and to down-covert, using the second mixer, in a second state of the second switch the second radio frequency reception signal, which has been output from the second front- end circuitry, so as to provide the same to the first input/output port, the second shared transmission path including a third mixer configured to provide in a first state of the third switch the third radio frequency transmission signal, which has been generated by up-converting a transmission signal input through a second input/output port of the wireless communication circuitry using the third mixer, to the third front-end circuitry and to provide in a second state of the third switch the fourth radio frequency transmission signal, which has been generated by up-converting a transmission signal input through the second input/output port of the wireless communication circuitry using the third mixer, to the fourth front-end circuitry;

the second shared reception path including a fourth mixer configured to down-convert, using the fourth mixer, the third radio frequency reception signal, which has been output from the third front-end circuitry, so as to provide the same to the second input/output port and to down-convert, using the fourth mixer, the fourth radio frequency reception signal, which has been output from the fourth front-end circuitry, so as to provide the same to the second input/output port, and the third shared reception path including a fifth mixer configured to down-convert, using the fifth mixer, the first radio frequency reception signal, the second radio frequency reception signal, the third radio frequency reception signal, or the fourth radio frequency reception signal, which has been output from the first front-end circuitry, the second front-end circuitry, the third front-end circuitry, or the fourth front-end circuitry, respectively, so as to provide the same to an output port of the wireless communication circuitry.

2. The electronic device of claim 1, wherein the first antenna structure comprises:
a first board; and
wherein the multiple first antenna elements are disposed on the first board so as to form a beam in a first direction.

3. The electronic device of claim 2, wherein the second antenna structure comprises:
a second board; and
wherein the multiple second antenna elements are disposed on the second board so as to form a beam in a second direction different from the first direction.

4. The electronic device of claim 3, wherein the first board comprises a first surface and a second surface facing a direction opposite to the first surface,
the multiple first antenna elements are disposed on the first surface, and
the wireless communication circuitry is disposed on the second surface.

5. The electronic device of claim 3, comprising:
a housing; and
a third board disposed in an inner space of the housing, wherein the wireless communication circuitry is disposed on the third board and electrically connected to the first antenna structure and the second antenna structure.

6. The electronic device of claim 1, further comprising at least one processor comprising processing circuitry, wherein the at least one processor is configured to provide the first radio frequency transmission signal to the first front-end circuitry via the first shared transmission path and the first switch, down-convert the first radio frequency reception signal output from the first front-end circuitry so as to output the same to the first input/output port via the first shared reception path and the second switch, provide the third radio frequency transmission signal to the third front-end circuitry via the second shared transmission path and the first switch, and when the third radio frequency reception signal output from the third front-end circuitry is down-converted and output to the second input/output port via the second shared reception path and second switch, monitor at least one of the vertical polarization of the second antenna structure or the horizontal polarization of the second antenna structure based on the second radio frequency reception signal or the fourth radio frequency reception signal, respectively, which has been output from the second front-end circuitry or the fourth front-end circuitry, respectively, and received through the output port.

7. The electronic device of claim 1, further comprising at least one processor comprising processing circuitry, wherein the at least one processor is configured to provide the first radio frequency transmission signal to the first front-end circuitry via the first shared transmission path and the first switch, and when the first radio frequency reception signal output from the first front-end circuitry is down-converted and provide to the first input/output port via the first shared reception path and the second switch, monitor at least one of the vertical polarization of the second antenna structure, the horizontal polarization of the first antenna structure, or the horizontal polarization of the second antenna structure based on the second radio frequency reception signal, the third radio frequency reception signal, or the fourth radio frequency reception signal, respectively, which has been output from the second front-end circuitry, the third front-end circuitry, or the fourth front-end circuitry, respectively, and received through the output port.

8. The electronic device of claim 7, wherein the at least one processor is further configured to control the fifth switch to selectively connect the first front-end circuitry, the second front-end circuitry, the third front-end circuitry, or the fourth front-end circuitry to the output port via the third shared reception path.

9. An electronic device comprising:
a first antenna structure comprising multiple first antenna elements, and
a second antenna structure comprising multiple second antenna elements; and
wireless communication circuitry configured to transmit and receive radio frequency signals via the first antenna structure and the second antenna structure, wherein the wireless communication circuitry comprises:

first front-end circuitry configured to amplify power of a first radio frequency transmission signal to be transmitted via the first antenna structure, and amplify a first radio frequency reception signal received via the first antenna structure;

second front-end circuitry configured to amplify power of a second radio frequency transmission signal to be transmitted via the second antenna structure, and amplify a second radio frequency reception signal received via the second antenna structure;

a first switch configured to connect a first shared transmission path to the first front-end circuitry or the second front-end circuitry;

the first shared transmission path including a first mixer and configured to output in a first state of the first switch the first radio frequency transmission signal, which has been generated by up-converting a transmission signal input through a first input/output port of the wireless communication circuitry using the first mixer, to the first front-end circuitry and to output in a second state of the first switch the second radio frequency transmission signal, which has been generated by up-converting a transmission signal input through the first input/output port of the wireless communication circuitry using the first mixer, to the second front-end circuitry; and a first reception path including a second mixer configured to down-convert, using the second mixer, the first radio frequency reception signal output from the first front-end circuitry so as to provide the same to the first input/output port, and a second reception path including a third mixer configured to down-convert, using the third mixer the second radio frequency reception signal output from the second front-end circuitry so as to provide the same to a first output port of the wireless communication circuitry.

10. The electronic device of claim 9, further comprising at least one processor, wherein the at least one processor is configured to provide the first radio frequency transmission signal to the first front-end circuitry via the first shared transmission path and the first switch, and when the first radio frequency reception signal output from the first front-end circuitry is down-converted and output to the first input/output port via the first reception path, monitor the second antenna structure on the basis of the second frequency reception signal which has been output from the second front-end circuitry and received via the first output port.

11. The electronic device of claim 9, wherein the first antenna structure is configured to form a vertical polarization and a horizontal polarization perpendicular to the vertical polarization via the multiple first antenna elements, and the second antenna structure is configured to form a vertical polarization and a horizontal polarization perpendicular to the vertical polarization via the multiple second antenna elements.

12. The electronic device of claim 11, wherein the first front-end circuitry is configured to amplify power of the first radio frequency transmission signal to be transmitted via the vertical polarization of the first antenna structure, and amplify the first radio frequency reception signal received via the vertical polarization of the first antenna structure, and the second front-end circuitry is configured to amplify power of the second radio frequency transmission signal to be transmitted via the vertical polarization of the second antenna structure, and amplify the second radio frequency reception signal received via the vertical polarization of the second antenna structure.

13. The electronic device of claim 12, wherein the wireless communication circuitry further comprises:

third front-end circuitry configured to amplify power of the third radio frequency transmission signal to be transmitted via the horizontal polarization of the first antenna structure, and amplify the third radio frequency reception signal received via the horizontal polarization of the first antenna structure;

fourth front-end circuitry configured to amplify power of the fourth radio frequency transmission signal to be transmitted via the horizontal polarization of the second antenna structure, and amplify the fourth radio frequency reception signal received via the horizontal polarization of the second antenna structure;

a second transmission path configured to provide at least one of the third radio frequency transmission signal or the fourth radio frequency transmission signal, which has been generated by up-converting a transmission signal input through a second input/output port of the wireless communication circuitry, to the third front-end circuitry or the fourth front-end circuitry, respectively; and a third reception path configured to down-convert the third radio frequency reception signal output from the third front-end circuitry so as to provide the same to the second input/output port, and a fourth reception path configured to down-convert the fourth radio frequency reception signal output from the fourth front-end circuitry so as to provide the same to a second output port of the wireless communication circuitry.

14. The electronic device of claim 9, wherein the first antenna structure comprises:

a first board; and wherein the multiple first antenna elements are disposed on the first board so as to be configured to form a beam in a first direction.

15. The electronic device of claim 14, wherein the second antenna structure comprises:

a second board; and wherein the multiple second antenna elements are disposed on the second board so as to be configured to form a beam in a second direction different from the first direction.

16. The electronic device of claim 15, wherein the first board comprises a first surface and a second surface facing a direction opposite to the first surface, the multiple first antenna elements are disposed on the first surface, and the wireless communication circuitry is disposed on the second surface.

17. The electronic device of claim 15, comprising:

a housing; and a third board disposed in an inner space of the housing, wherein the wireless communication circuitry is disposed on the third board and electrically connected to the first antenna structure and the second antenna structure.

18. The electronic device of claim 9, wherein the wireless communication circuitry further comprises a transmission buffer configured to store an output of the first mixer.

19. The electronic device of claim 9, wherein the wireless communication circuitry further comprises a first reception buffer disposed on the first reception path, wherein the second mixer configured to down-convert the first radio frequency reception signal received from the first front-end circuitry through the first reception buffer, and wherein a second reception buffer disposed on the second reception path, and a third mixer configured to down-convert the second radio frequency reception signal received from the second front-end circuitry through the second reception buffer.

* * * * *